US012583001B2

(12) United States Patent
Johnston et al.

(10) Patent No.: US 12,583,001 B2
(45) Date of Patent: Mar. 24, 2026

(54) SPRAY GUN AND COMPONENTS FOR SPRAYING PAINTS AND OTHER COATINGS

(71) Applicant: Graco Minnesota Inc., Minneapolis, MN (US)

(72) Inventors: Justin G. Johnston, Rogers, MN (US); Steve J. Wrobel, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 319 days.

(21) Appl. No.: 18/196,873

(22) Filed: May 12, 2023

(65) Prior Publication Data

US 2023/0278053 A1 Sep. 7, 2023

Related U.S. Application Data

(63) Continuation of application No. 16/773,122, filed on Jan. 27, 2020, now Pat. No. 11,684,937, which is a
(Continued)

(51) Int. Cl.
*B05B 9/01* (2006.01)
*B05B 1/30* (2006.01)
(Continued)

(52) U.S. Cl.
CPC .............. *B05B 9/01* (2013.01); *B05B 1/3046* (2013.01); *B05B 12/002* (2013.01);
(Continued)

(58) Field of Classification Search
CPC ....... B05B 9/01; B05B 1/3046; B05B 12/002; B05B 15/40; B05B 15/16; B05B 15/60; B05B 12/0026
(Continued)

(56) References Cited

U.S. PATENT DOCUMENTS 1,643,969 A * 10/1927 Tittemore ............. B05B 7/1218 251/285
2,934,308 A * 4/1960 Kaufmann .............. F23D 91/02 251/114
(Continued)

FOREIGN PATENT DOCUMENTS

CN 201630052 U 11/2010
CN 201697544 U 1/2011
(Continued)

OTHER PUBLICATIONS

First Australian Exam Report for AU Application No. 2019202108, Dated Jan. 24, 2024, pp. 4.
(Continued)

*Primary Examiner* — Chee-Chong Lee
(74) *Attorney, Agent, or Firm* — Kinney & Lange, P.A.

(57) ABSTRACT

A spray gun includes a valve cartridge configured to be axially installed and removed as a single piece. The valve cartridge includes the wear components of the spray gun. A trigger of the spray gun is configured to actuate a slider of the valve cartridge to control spraying by the spray gun. The trigger can slide between a spray position, where the trigger prevents forward axial movement of the valve cartridge, and a repair position, where the valve cartridge can move axially forward.

19 Claims, 15 Drawing Sheets

Related U.S. Application Data continuation of application No. 16/366,802, filed on Mar. 27, 2019, now Pat. No. 10,589,303.

(60) Provisional application No. 62/787,671, filed on Jan. 2, 2019, provisional application No. 62/651,188, filed on Apr. 1, 2018.

(51) Int. Cl.
*B05B 12/00* (2018.01)
*B05B 15/16* (2018.01)
*B05B 15/40* (2018.01)
*B05B 15/60* (2018.01)

(52) U.S. Cl.
CPC ........... *B05B 12/0026* (2018.08); *B05B 15/16* (2018.02); *B05B 15/40* (2018.02); *B05B 15/60* (2018.02)

(58) Field of Classification Search
USPC .......................................................... 29/401.1
See application file for complete search history.

(56) References Cited

U.S. PATENT DOCUMENTS

| | | | | | |
|---|---|---|---|---|---|
| 2,991,945 | A | * | 7/1961 | Rosenkranz | B05B 12/0022 251/114 |
| 3,190,564 | A | * | 6/1965 | Liedberg | B05B 9/01 251/294 |
| 3,380,705 | A | * | 4/1968 | Enssle | B05B 9/01 251/294 |
| 3,396,937 | A | * | 8/1968 | McDougall | B05B 9/01 251/107 |
| 3,515,355 | A | * | 6/1970 | Wagner | B05B 1/14 239/526 |
| 3,633,828 | A | | 1/1972 | Larson | |
| 3,780,953 | A | * | 12/1973 | Malec | B05B 9/01 251/98 |
| 3,861,695 | A | | 1/1975 | Shourek et al. | |
| 3,876,154 | A | | 4/1975 | Griebel | |
| 4,166,579 | A | | 9/1979 | Beise et al. | |
| 4,676,437 | A | | 6/1987 | Brown | |
| 5,423,348 | A | | 6/1995 | Jezek et al. | |
| 5,695,120 | A | | 12/1997 | Kingsford | |
| 5,699,967 | A | | 12/1997 | Conatser et al. | |
| 5,857,452 | A | | 1/1999 | Troncoso | |
| 6,032,661 | A | | 3/2000 | Goff et al. | |
| 6,205,991 | B1 | | 3/2001 | Summers et al. | |
| 6,302,093 | B1 | | 10/2001 | Holland | |
| 6,367,465 | B1 | | 4/2002 | Buccieri | |
| 6,651,642 | B1 | | 11/2003 | Powers | |
| 6,817,728 | B2 | | 11/2004 | Goko | |
| 7,243,771 | B2 | | 7/2007 | Shanahan | |
| 9,052,149 | B2 | | 6/2015 | Bender | |
| 9,192,952 | B2 | | 11/2015 | Becker et al. | |
| 2002/0109019 | A1 | | 8/2002 | May | |
| 2007/0108233 | A1 | | 5/2007 | Grayden | |
| 2009/0026290 | A1 | | 1/2009 | Fox | |
| 2011/0121103 | A1 | | 5/2011 | Carleton et al. | |
| 2019/0299232 | A1 | | 10/2019 | Johnston et al. | |

FOREIGN PATENT DOCUMENTS

| | | | |
|---|---|---|---|
| CN | 102186597 | A | 9/2011 |
| CN | 102215981 | A | 10/2011 |
| CN | 103298564 | A | 9/2013 |
| CN | 203459210 | U | 3/2014 |
| CN | 204107707 | U | 1/2015 |
| CN | 210171741 | U | 3/2021 |
| DE | 2827402 | A1 | 1/1980 |
| DE | 3148898 | A1 | 6/1983 |
| DE | 20104036 | U1 | 6/2001 |
| EP | 1232796 | A1 | 8/2002 |
| JP | H0857366 | A | 3/1996 |
| KR | 20030095319 | A | 12/2003 |
| NO | 2009015260 | A2 | 1/2009 |
| RU | 2391142 | C1 | 6/2010 |
| RU | 2457041 | C2 | 7/2012 |
| RU | 2601337 | C2 | 11/2016 |

OTHER PUBLICATIONS

Third Chinese Office Action for CN Application No. 202210044455.8, Dated Nov. 29, 2023, pp. 10.

Chinese Notification to go through formalities for registration for CN Application No. 2022100444558, Dated Apr. 1, 2024, pp. 7.

Extended European Search Report for EP Application No. 24165038.1, Dated Jun. 18, 2024, pp. 7.

Extended European Search Report for EP Application No. 19166594.2, Dated Sep. 2, 2019, pp. 9.

First Brazilian Office Action for BR Application No. BR102019006520, Dated Sep. 7, 2022, pp. 6.

First Chinese Office Action for CN Application No. 2019102411947, Dated Oct. 10, 2020, pp. 30.

First Chinese Office Action for CN Application No. 2019102412884, Dated Sep. 4, 2020, pp. 10.

First Chinese Office Action for CN Application No. 202210044455.8, Dated Nov. 30, 2022, pp. 29.

First Communication pursuant to 94(3) EPC for EP Application No. 19166594.2, dated Jul. 21, 2020, pp. 7.

First Russian Office Action for RU Application No. 2019109351/05, Dated Oct. 29, 2021, pp. 9.

First Tawain Office Action for TW Application No. 108111132, Dated Mar. 21, 2023, pp. 21.

Russian Decision to Grant for RU Application No. 2019109351/05, Dated Mar. 9, 2022, pp. 26.

Second Chinese Office Action for CN Application No. 2019102411947, Dated Jun. 2, 2021, pp. 13.

Second Chinese Office Action for CN Application No. 2019102412884, Dated Jun. 23, 2021, pp. 32.

Second Communication Pursuant to Article 94(3) EPC for EP Application No. 19166594.2, Dated Mar. 30, 2022, pp. 7.

Second Chinese Office Action for CN Application No. 202210044455.8, Dated Jun. 27, 2023, pp. 24.

* cited by examiner

SPRAY GUN AND COMPONENTS FOR SPRAYING PAINTS AND OTHER COATINGS

CROSS-REFERENCE TO RELATED APPLICATION(S)

This application is a continuation of U.S. application Ser. No. 16/773,122 filed Jan. 27, 2020 for "SPRAY GUN AND COMPONENTS FOR SPRAYING PAINTS AND OTHER COATINGS," which in turn is a continuation of U.S. application Ser. No. 16/366,802 filed Mar. 27, 2019 for "SPRAY GUN AND COMPONENTS FOR SPRAYING PAINTS AND OTHER COATINGS," now U.S. Pat. No. 10,589,303, which in turn claims the benefit of U.S. Provisional Application No. 62/651,188 filed Apr. 1, 2018 for "SPRAY GUN AND COMPONENTS FOR SPRAYING PAINTS AND OTHER COATINGS," and of U.S. Provisional Application No. 62/787,671 filed Jan. 2, 2019, and entitled "SPRAY GUN AND COMPONENTS FOR SPRAYING PAINTS AND OTHER COATINGS," the disclosures of which are hereby incorporated by reference in their entireties.

BACKGROUND

This disclosure relates generally to sprayers. More specifically, this disclosure relates to spray guns for sprayers.

Spray guns can be used to spray fluids on surfaces. For example, spray guns can be used to spray paint, lacquer, finishes, and other coatings on walls, ceilings, and other structures. While various fluids can be sprayed by the embodiments referenced herein, paint will be used as an example.

Typically, the paint is placed under pressure by a piston, diaphragm, or other positive displacement pump. The pump can place the paint under pressure between 500 to 5,000 pounds per square inch (psi), although higher and lower pressures are possible. The pump outputs the paint under pressure through a flexible hose. A spray gun is used to dispense the paint, the gun being attached to the end of the hose opposite the pump. In this way, the spray gun does not include a pump, but rather releases paint pumped to the spray gun through the hose. The spray gun atomizes the paint under pressure into a spray fan, which is applied to a surface. The pump and mechanical and/or electrical systems which operate the pump are typically stationary while the user moves the gun and hose around to spray various surfaces.

Paint and other coatings can be abrasive, and can wear on the spray gun and other components of the spray system. Spray guns typically require maintenance over time, which involves replacement of components worn down by use, particularly those components that move while handling the flow of paint under high fluid pressure. Ideally, users are able to service and repair the spray gun in the field to minimize disruption to their present project. A spray gun having enhanced field serviceability is disclosed herein. Other spray gun features are disclosed herein as well.

SUMMARY

According to one aspect of the disclosure, a valve cartridge for a paint spray gun includes a housing, a seal assembly disposed within the housing, a spring disposed within the housing, a slider disposed at least partially outside of the housing, and a stem. The housing has a first end, a second end, a housing body extending between the first end and the second end, a cartridge outlet extending through the first end, a chamber within the housing, and a plurality of ports extending through the housing and in fluid communication with the chamber. The seal assembly is configured to control the flow of paint from the chamber through the cartridge outlet. The spring is configured to bias the seal assembly towards a closed state. The stem extends along an axis between the seal assembly and the slider. The seal assembly and the slider are fixed to the stem such that the slider can actuate the seal assembly from the closed state to an open state via the stem. The seal assembly and the spring are secured within the chamber such that the housing, the seal assembly, the spring, the slider, and the stem form a discrete assembly configured to control spraying of paint.

According to another aspect of the disclosure, a paint spray gun includes a gun body and a valve cartridge. The gun body defines a spray axis and includes a front end having a gun bore aligned on the axis; a back end having a gun cavity aligned on the axis; and a void disposed between the front end and the back end, wherein the void is open at least through a top side and first and second lateral sides of the gun body. The valve cartridge includes a housing, a seal assembly disposed within the housing, a spring disposed within the housing, a slider at least partially outside of the housing, and a stem. The housing is disposed at least partially within the gun bore. The housing has a first end, a second end, a housing body extending between the first end and the second end, a cartridge outlet extending through the first end, a chamber within the housing, and a plurality of ports extending through the housing and in fluid communication with the chamber. The seal assembly is configured to control the flow of paint from the chamber through the cartridge outlet. The spring is configured to bias the seal assembly towards a closed state. The stem extends along an axis between the seal assembly and the slider. The seal assembly and the slider are fixed to the stem such that the slider can actuate the seal assembly from the closed state to an open state via the stem. The seal assembly and the spring are secured within the chamber such that the valve cartridge forms a discrete assembly independent of the gun body such that the valve cartridge can be inserted into the gun body as a single piece, can regulate spraying of paint when inserted into the gun body, and can be removed from the gun body as the single piece.

According to yet another aspect of the disclosure, a method of installation includes aligning a valve cartridge with a spray axis of a spray gun body, the spray gun body including a front end, a back end, and a void disposed between the front end and the back end; shifting the valve cartridge axially along the spray axis, such that the valve cartridge extends into a bore aligned along the spray axis and extending through the front end to the void, and such that a slider of the valve cartridge extends out of the bore across the void and into a cavity aligned on the spray axis and extending into the back end; and securing the valve cartridge within the spray gun body.

According to yet another aspect of the disclosure, a spray gun includes a gun body, a valve cartridge, and a trigger mechanism. The gun body defines a longitudinal spray axis and includes a front end having a gun bore aligned on the axis, a back end having a gun cavity aligned on the axis, and a void disposed between the front end and the back end, wherein the void is open at least through a top side and first and second lateral sides of the gun body. The valve cartridge includes a housing disposed in the gun bore, a valve element disposed within the housing and configured to control fluid flow out of the housing, and a slider connected to the valve element, such that movement of the slider causes movement of the valve element, wherein the slider extends into the gun cavity. The trigger mechanism is mounted on the gun body and engages the slider. The trigger mechanism is configured to shift the slider axially to control actuation of the valve element between a closed position and an open position.

According to yet another aspect of the disclosure, a method includes shifting a trigger mechanism of a spray gun from a spray position to a repair position, the trigger mechanism being connected to a gun body of the spray gun in both the spray position and the repair position; and shifting a valve cartridge in a first axial direction along a spray axis of the gun body to remove the valve cartridge from the gun body.

According to yet another aspect of the disclosure, a spray gun includes a gun body defining a longitudinal spray axis, a spray valve disposed within the gun body and configured to control spraying by the spray gun, and a trigger mounted on the gun body and configured to actuate the spray valve between an open state and a closed state. The trigger includes an upper portion mounted to the spray gun; and a lower portion disposed on the upper portion and movable relative to the upper portion such that the trigger is extendable.

According to yet another aspect of the disclosure, a trigger for a spray gun includes an upper portion; a lower portion disposed on the upper portion; a first arm extending from the upper portion and configured to mount to a first lateral side of the spray gun; a second arm extending from the upper portion and configured to mount to a second lateral side of the spray gun; and an actuator extending between and connecting the first arm and the second arm. The lower portion is movable relative to the upper portion to alter a length of the trigger.

According to yet another aspect of the disclosure, a method of adjusting a trigger length includes accessing a fastening mechanism through a gap disposed between a first bracket on a first lateral side of a lower portion of the trigger and a second bracket on a second lateral side of the lower portion, and disengaging the fastening mechanism from the lower portion; pulling the lower portion lengthwise along an upper portion of the trigger from a first position to a second position, wherein a stop projecting from one of the first lateral side and the second lateral side engages a first index of the upper portion with the lower portion in the first position and the stop engages a second index of the upper portion with the lower portion in the second position; and reengaging the fastening mechanism with the lower portion to secure the lower portion in the second position.

DETAILED DESCRIPTION

Figure 1A:
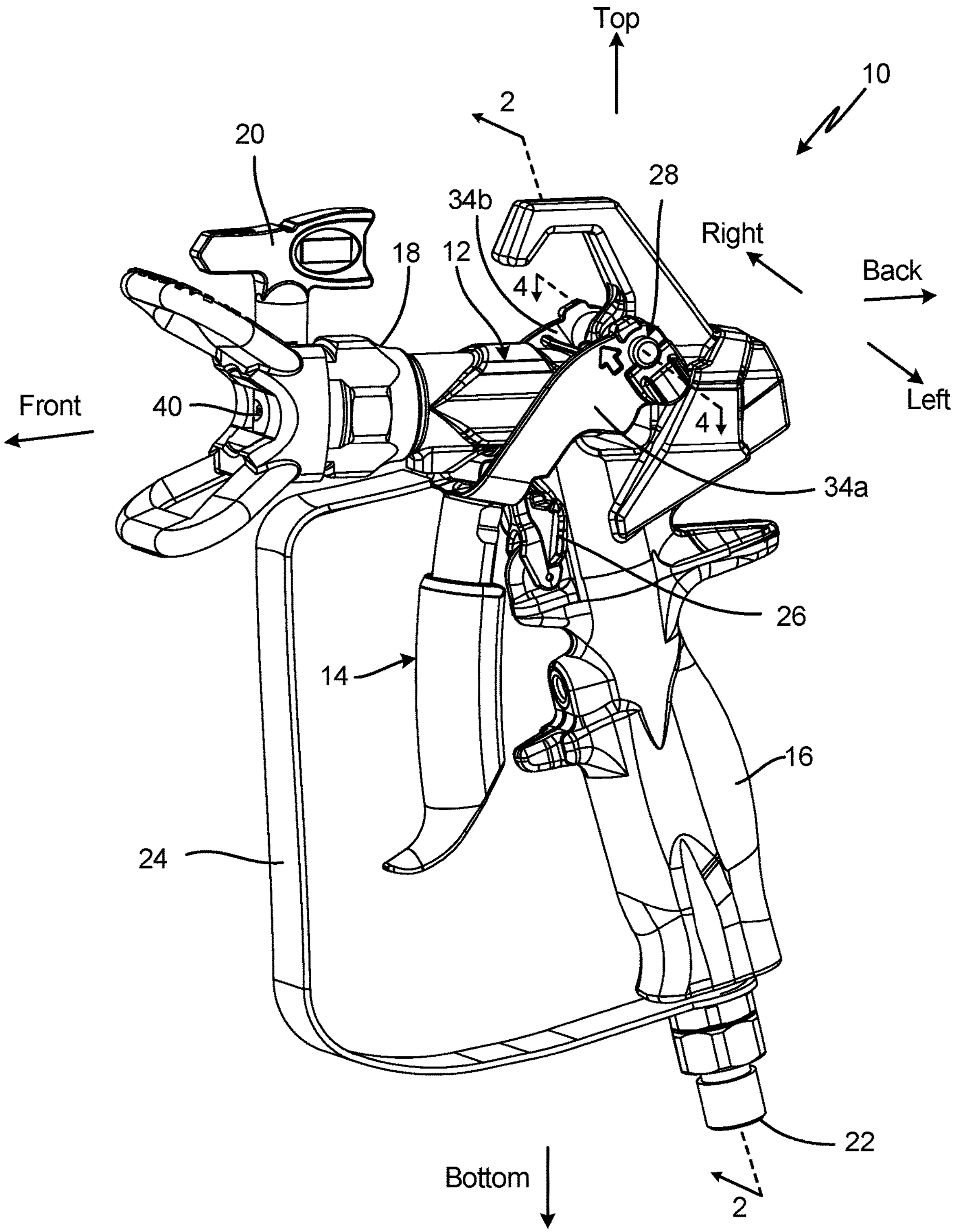
FIG. 1A is an isometric view of a spray gun.
Figure 1B:
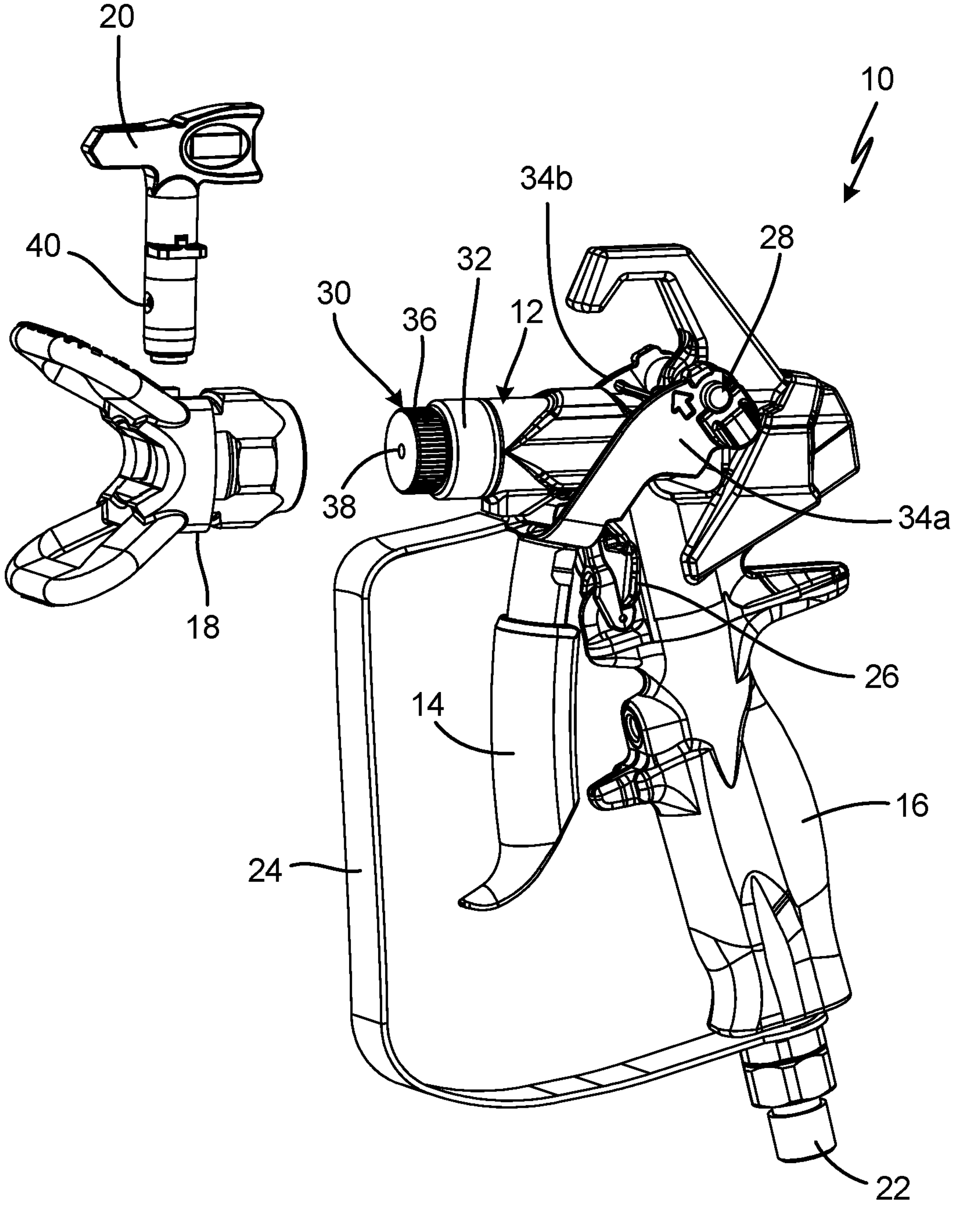
FIG. 1B is a partially exploded view of a spray gun.

FIG. 1A is an isometric view of spray gun 10. FIG. 1B is a partially exploded view of spray gun 10. Spray gun 10 includes gun body 12, trigger 14, handle 16, tip mount 18, tip 20, connector 22, trigger guard 24, safety 26, pivot mechanism 28, and valve cartridge 30. Gun body 12 includes mounting surface 32. Trigger 14 includes arms 34*a*, 34*b*. Grip surface 36 and cartridge outlet 38 of valve cartridge 30 are shown in FIG. 1B. Tip 20 includes nozzle 40.

Gun body 12 is mounted on handle 16. Connector 22 is attached to bottom of handle 16 and is configured to attach to the end of a hose that supplies paint to spray gun 10 under pressure. Connector 22 can be of a quick disconnect type, or any other desired type of hose connector. Handle 16 can be formed from polymer or metal. Handle 16 is configured to be gripped by one hand of a user to hold, support, and aim spray gun 10 while also allowing the user to actuate trigger 14. Gun body 12 can be formed of any suitable material for receiving various components of spray gun 10 and for providing a pathway for pressurized paint. In some examples, gun body 12 is formed from a metal, such as aluminum.

Tip mount 18 is attached to gun body 12 at mounting surface 32. Tip mount 18 can be removably mounted to gun body 12. For example, tip mount 18 can fit over a front end of gun body 12, and tip mount 18 can include internal threading that interfaces with external threading on the front end of gun body 12 to fix tip mount 18 to gun body 12. In such an example, mounting surface 32 can include the external threading. Unthreading tip mount 18 from gun body 12 allows removal of tip mount 18 from gun body 12. Spray tip 20 is mounted in a bore of tip mount 18. Nozzle 40 is formed in tip 20. Nozzle 40 can be formed from carbide or another metal. Nozzle 40 includes a narrow outlet that is configured to atomize the paint exiting nozzle 40 into a spray fan. Tip 20 is mounted in tip mount 18 such that tip 20 can be rotated 180 degrees to reverse the direction of paint flow through nozzle 40. Rotating tip mount exposes a larger opening than the opening of nozzle 40. That larger opening is disposed on the opposite side of tip 20 from nozzle 40.

Any clogs can be dislodged from tip 20 and ejected from that larger opening with tip 20 is in the reversed position.

As shown in FIG. 1B, valve cartridge 30 is disposed within gun body 12. Valve cartridge 30 is covered by tip mount 18 when tip mount 18 is disposed on gun body 12. Paint is output from valve cartridge 30 via cartridge outlet 38. The paint flows through tip mount 18, to tip 20, and out of tip 20 through nozzle 40. When valve cartridge 30 is secured (e.g., threadedly attached, as further discussed herein) to and within gun body 12, grip surface 36 is exposed out of the front end of gun body 12. Tip mount 18 covers and encloses grip surface 36 when tip mount 18 is attached to gun body 12. Grip surface 36 can be a grooved, knurled, textured, or otherwise non-smooth surface configured to enhance gripping by a user's hand to facilitate removal of valve cartridge 30 from gun body 12.

Trigger 14 is mounted to gun body 12 and is configured to actuate a valve element of valve cartridge 30 to control spraying by spray gun 10. Arms 34*a*, 34*b* extend from opposite lateral sides of trigger 14 and wrap around gun body 12. As shown, arms 34*a*, 34*b* are formed as part of trigger 14. It is understood, however, that while arms 34*a*, 34*b* can be formed from the same material as the trigger 14 (e.g., a contiguous piece of metal), arms 34*a*, 34*b* can also be formed separate from trigger 14, from either the same or different materials, and can be fixed to trigger 14 at the lower ends of arms 34*a*, 34*b*.

Arms 34*a*, 34*b* are connected to gun body 12 at pivot mechanism 28. Arms 34*a*, 34*b*, and thus trigger 14, are supported on gun body 12 by pivot mechanism 28, such that pivot mechanism 28 forms the pivot point about which trigger 14 pivots relative to gun body 12. Arms 34*a*, 34*b* connect trigger 14 to gun body 12 and are located on left and right lateral sides of gun body 12, while trigger 14 is centered with respect to the lateral sides of gun body 12. While two arms 34*a*, 34*b* are shown, it is understood that, in some examples, a single arm 34 can support trigger 14 and can be located on one side of gun body 12.

Safety 26 is attached to gun body 12 and is pivotable between a stowed, up position and a deployed, down position. Safety 26 interfaces with trigger 14 to prevent trigger 14 from being activated to cause spraying when in the deployed position. While safety 26 is described as mounted to gun body 12, it is understood that safety 26 can alternatively be mounted to handle 16. Trigger guard 24 extends from a bottom of handle 16 to gun body 12. Trigger guard 24 surrounds trigger 14 to prevent inadvertent actuation of trigger 14.

Figure 2A:
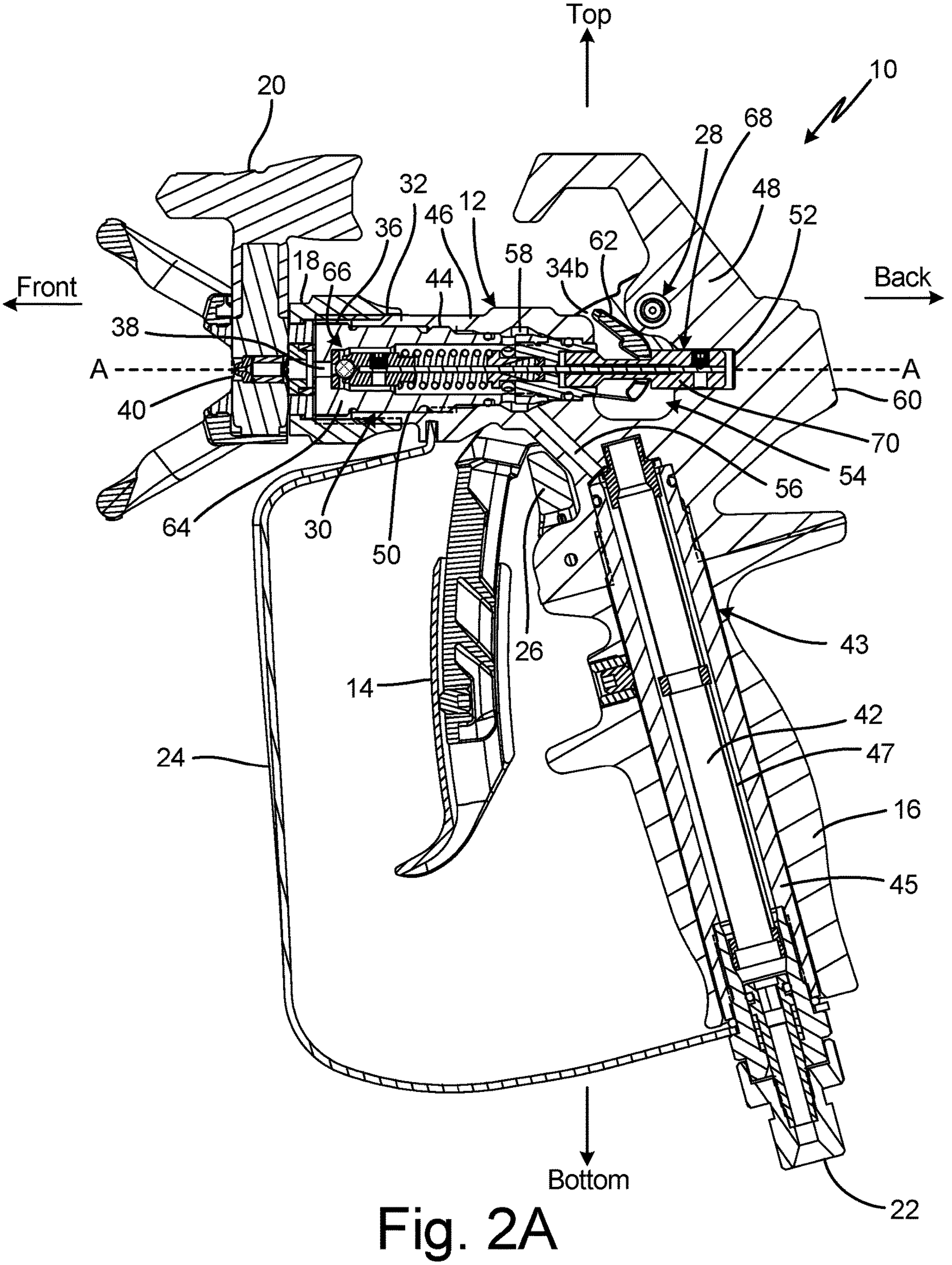
FIG. 2A is a cross-sectional view of a spray gun taken along line 2-2 in FIG. 1A, showing a trigger in a non-actuated state.
Figure 2B:
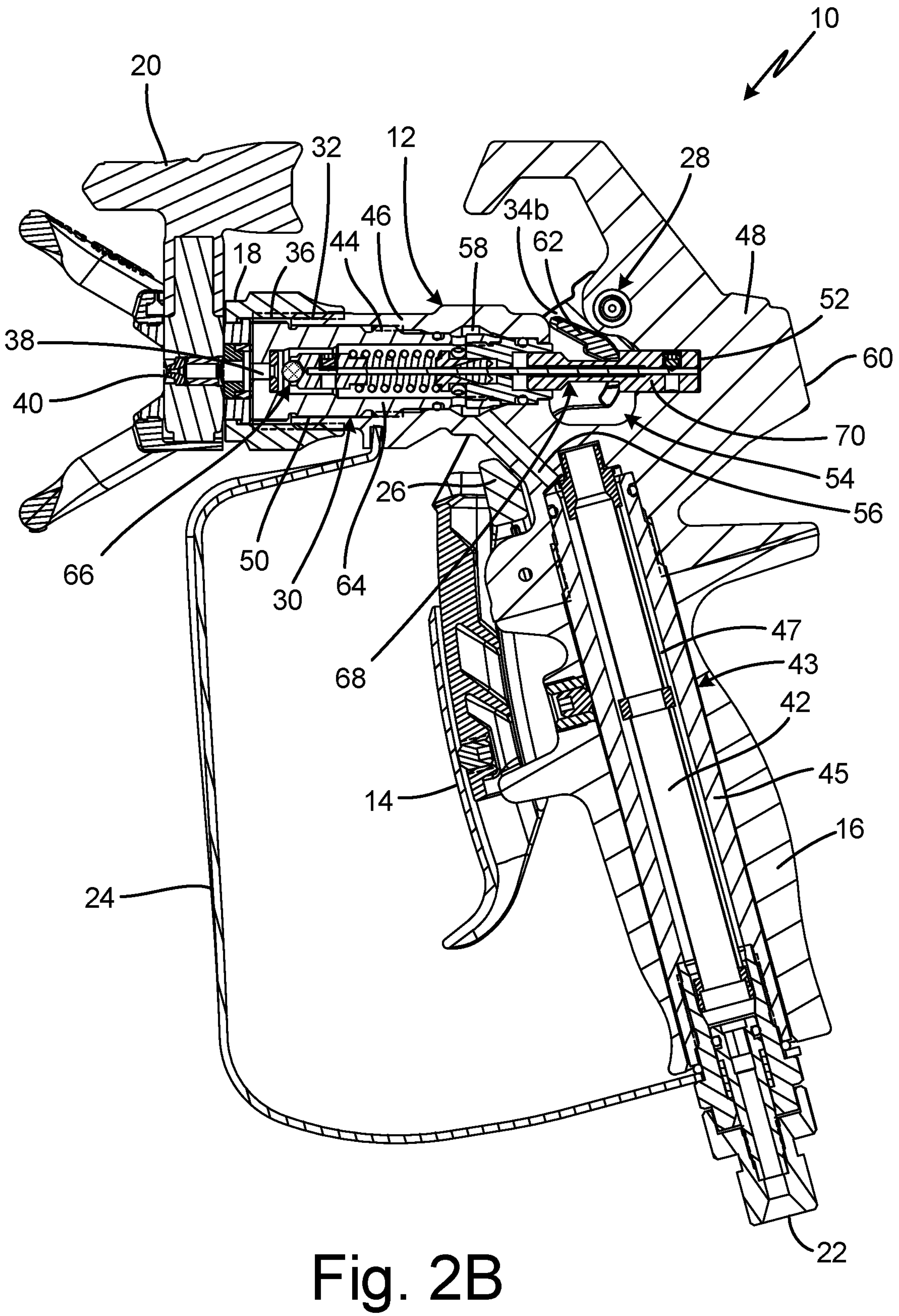
FIG. 2B is a cross-sectional view of a spray gun taken along line 2-2 in FIG. 1A, showing the trigger in an actuated state.

FIG. 2A is a cross-sectional view of spray gun 10 taken along line 2-2 in FIG. 1A showing trigger 14 in a non-actuated state. FIG. 2B is a cross-sectional view of spray gun 10 taken along line 2-2 in FIG. 1A showing trigger 14 in an actuated state. Spray gun 10 includes gun body 12, trigger 14, handle 16, tip mount 18, tip 20, connector 22, trigger guard 24, safety 26, pivot mechanism 28, valve cartridge 30, inlet passage 42, filter 43, and threaded interface 44. Gun body 12 includes mounting surface 32, front end 46, back end 48, bore 50, cylindrical cavity 52, void 54, channel 56, chamber 58, and back side 60. Trigger 14 includes arms 34*a*, 34*b* (only arm 34*b* is shown in FIGS. 2A and 2B) and actuator 62. Tip 20 includes nozzle 40. Valve cartridge 30 includes grip surface 36, cartridge outlet 38, housing 64, valve 66, and slider assembly 68. Slider assembly 68 includes slider 70. Filter 43 includes filter housing 45 and mesh 47.

Handle 16 is attached to gun body 12. Connector 22 is attached to a bottom of handle 16 and is configured to receive a hose to supply paint to spray gun 10. Inlet passage 42 extends through handle 16 and into gun body 12. Filter 43 is disposed in inlet passage 42. Filter housing 45 can be a pressure carrying component, such that handle 16 can be made of either metal or polymeric material. Filter 43 reduces the likelihood of clogging at nozzle 40. Channel 56 extends between inlet passage 42 and bore 50. More specifically, channel 56 extends to chamber 58 formed within bore 50. Bore 50 is formed within front end 46 of gun body 12 and extends into back end 48 of gun body 12. Bore 50 is open on a front side front end 46 of gun body 12. Bore 50 extends through front end 46 of gun body 12 to void 54 in gun body 12. Void 54 is disposed between front end 46 and back end 48 of gun body 12. In some examples, void 54 is open on the lateral and top sides of gun body 12. Cylindrical cavity 52 is a portion of bore 50 extending into back end 48 of gun body 12. Cylindrical cavity 52, and thus bore 50, does not extend through and is not open on back side 60 of gun body 12. Bore 50 is oriented on spray axis A-A.

Valve cartridge 30 fits within bore 50. Specifically, housing 64 of valve cartridge 30 is disposed within bore 50. Bore 50 forms, amongst other features, chamber 58. Threaded interface 44 is formed between the exterior of housing 64 of valve cartridge 30 and the interior of bore 50. Threaded interface 44 secures valve cartridge 30 within bore 50. As further shown herein, valve cartridge 30 can be unscrewed and then removed from bore 50 through the front end of bore 50. A portion of valve cartridge 30, such as slider 70, bridges void 54. A portion of slider 70 of valve cartridge 30 fits within cylindrical cavity 52 within gun body 12. Bore 50 and cylindrical cavity 52 are coaxially aligned on spray axis A-A.

In some examples, housing 64 is prevented from moving rearward with respect to gun body 12 by a narrowing of the exterior surface of valve cartridge 30 fitting into and engaging a narrowing interior surface of bore 50. The two narrowing profiles can narrow in width from the front towards the back of bore 50 to prevent relative rearward movement of housing 64 within bore 50. The two narrowing profiles can prevent further rearward movement of housing 64 and seal body 72 within bore 50.

Trigger 14 is mounted to gun body 12 at pivot mechanism 28 by arms 34*a*, 34*b*. Actuator 62 extends between and is attached to arms 34*a*, 34*b*. Actuator 62 can be a bridge that extends between, and connects to each of, the left and right arms 34*a*, 34*b*. Actuator 62 can be formed from the same material as arms 34*a*, 34*b* or from a different material from arms 34*a*, 34*b*. It is thereby understood that actuator 62 and arms 34*a*, 34*b* can be formed as a unitary part (i.e., single contiguous piece of material) or can be formed separately and fixed together. Actuator 62 can be metallic or can be formed from another suitably durable material for impacting slider 70 to actuate valve 66.

Actuator 62 extends between the opposed, inside surfaces of arms 34*a*, 34*b*. Actuator 62 extends through void 54 in gun body 12 to connect arms 34*a*, 34*b*. Being connected to arms 34*a*, 34*b*, actuator 62 moves with arms 34*a*, 34*b* and trigger 14 and pivots with respect to gun body 12. Actuator 62 moves within void 54 along with trigger 14 to push a part (e.g., slider 70) of valve cartridge 30 rearwards to open valve 66 within valve cartridge 30 when spraying is desired. Actuator 62 can release the part of valve cartridge 30 to close valve 66 when spraying is not desired.

During operation, paint enters spray gun 10 via connector 22. The paint travels within filter 43 up inlet passage 42 to channel 56. The paint travels through outside mesh 47 and into filter housing 45, and the paint flows through filter housing 45 to channel 56. The paint travels through channel 56 and into chamber 58. From chamber 58, the paint flows into housing 64 of valve cartridge 30 and eventually out of cartridge outlet 38 and then through nozzle 40. With trigger 14 in the non-actuated state, shown in FIG. 2A, valve 66 of valve cartridge 30 is in the closed position, thereby closing the flowpath through cartridge outlet 38. With trigger 14 in the actuated state, shown in FIG. 2B, valve 66 of valve cartridge 30 is in the open position, thereby opening the flowpath through cartridge outlet 38.

As shown in FIG. 2B, trigger 14 has been moved rearwards to the actuated state, which also moves arms 34*a*, 34*b* rearwards. The backward motion of arms 34*a*, 34*b* moves actuator 62 backwards within void 54. In its backward movement, actuator 62 engages with (if not already engaged) and moves slider 70 rearwards. Moving slider 70 causes slider assembly 68 to open valve 66 inside valve cartridge 30 and allow the release of paint from cartridge outlet 38. In this action, slider 70 of valve cartridge 30 moves axially within void 54 and axially within cylindrical cavity 52. Threaded interface 44 holds part of housing 64 of valve cartridge 30 in place within bore 50 with respect to gun body 12 while slider 70 is moved rearwards.

Figure 3:
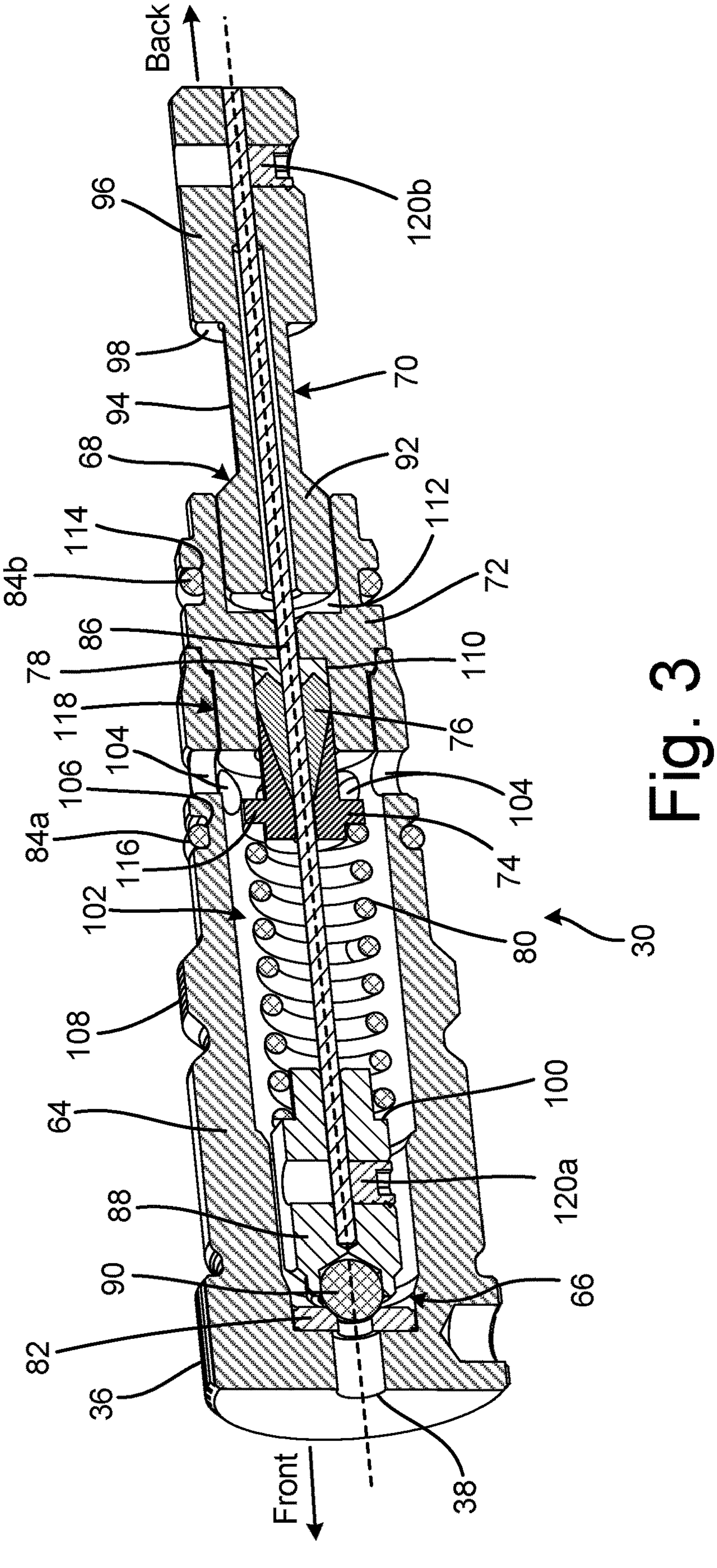
FIG. 3 is an isometric cross-sectional view of a valve cartridge.

FIG. 3 is a cross-sectional view of valve cartridge 30. Valve cartridge 30 includes housing 64, valve 66, slider assembly 68, seal body 72, seal retainer 74, seal 76, gland 78, spring 80, seat 82, and o-rings 84*a*, 84*b*. Slider assembly 68 includes slider 70, stem 86, seal holder 88, valve seal 90, and threaded interface 118. Slider 70 includes front end 92, neck 94, and back end 96. Back end 96 includes trigger seat 98. Seal holder 88 includes shoulder 100. Housing 64 includes grip surface 36, cartridge outlet 38, housing chamber 102, ports 104, first groove 106, and exterior threading 108. Seal body 72 includes seal bore 110, guide bore 112, and second groove 114. Seal retainer 74 includes retainer flange 116.

The cross section shown in FIG. 3 is taken along an axis of valve cartridge 30, which is coaxial with spray axis A-A (FIG. 2A) when valve cartridge 30 is mounted in spray gun 10 (best seen in FIG. 1A). Valve cartridge 30 is symmetric about its axis (i.e. the other half of valve cartridge 30 is a mirror image of what is shown). Unless otherwise noted, all components shown in FIG. 3 are aligned coaxially with the axis.

Valve cartridge 30 comprises three main exterior components, however another number of main exterior components can be used to form the exterior of valve cartridge 30. The exterior components of valve cartridge 30 include housing 64, seal body 72, and slider 70.

The first of the main exterior components is housing 64. Housing 64 contains the elements that control the release of paint from cartridge outlet 38. Housing 64 can be formed from stainless steel, aluminum, or another type of metal. Housing 64 includes external annular threaded surface 108 which interfaces with internal threading within bore 50 (FIGS. 2A-2B) of gun body 12 to form threaded interface 44 (FIGS. 2A-2B) that secures valve cartridge 30 within bore 50.

The second of the main exterior components of valve cartridge 30 is seal body 72. Seal body 72 extends into an annular cavity on the back side of housing 64. Seal body 72 is fixed to housing 64. In the example shown, seal body 72 is fixed to housing 64 by threaded interface 118. Threaded interface 118 is comprised of internal threading within the annular cavity on the back side of housing 64 which interfaces with external threading on seal body 72. Seal body 72 can be torqued to housing 64 to such a degree as to not allow a user to unthread the threaded interface 118 by hand (or even with conventional tools). Additionally or alternatively, adhesive can be added to threaded interface 118 to prevent unthreading of seal body 72 and housing 64 by a user. While threading is used as an example, it is understood that seal body 72 can be fixed to housing 64 in any desired manner. For example, the front end of seal body 72, already shown as being within the annular cavity of the back side of housing 64, can be press fit into housing 64. Additionally or alternatively, seal body 72 can be glued (e.g., with epoxy) or welded to housing 64. High torqueing, gluing, press fitting, and/or welding can be done to permanently connect seal body 72 to housing 64 to prevent decoupling because, in various examples, it is not intended that seal body 72 would be decoupled from housing 64. In some examples, housing 64 and seal body 72 are a unitary part formed from the same piece of metal, instead of being two parts joined together.

The third of the main exterior components of valve cartridge 30 is slider 70 of slider assembly 68. Slider 70 can be formed from metal, such as stainless steel, among other options. Neck 94 extends between and connects front end 92 and back end 96 of slider 70. Neck 94 is cylindrical and configured to have a smaller diameter relative to front end 92 and back end 96. In some examples, neck 94 has a diameter about half as large as one or both of front end 92 and back end 96. In some examples, the diameter of neck 94 is less than half the diameter of one or both of front end 92 and back end 96. Each of front end 92 and back end 96 are similarly cylindrical. The reduced diameter of neck 94 exposes trigger seat 98 formed on back end 96. In the illustrated example, trigger seat 98 is an annular forward facing surface that extends radially relative to neck 94, but in other examples trigger seat 98 can have different shapes. Front end 92 of slider 70 extends into guide bore 112 formed in seal body 72. In some examples, guide bore 112 is a cylindrical cavity configured to receive front end 92. Front end 92 is configured to move within, and relative to, guide bore 112.

First groove 106 is an annular groove extending into a portion of the exterior of housing 64 rearward of exterior threading 108. O-ring 84*a* is located in first groove 106. Second groove 114 is an annular groove extending into a portion of the exterior of seal retainer 74. O-ring 84*b* is located in second groove 114. The o-rings 84*a*, 84*b* can be formed from rubber or any other suitable sealing material. In some examples, o-rings 84*a*, 84*b* can be the only components of valve cartridge 30 exposed on the exterior of valve cartridge 30 apart from housing 64, seal retainer 74, and slider 70. Likewise, the two o-rings 84*a*, 84*b* can be the only o-rings 84 of valve cartridge 30 and/or the only two o-rings 84*a*, 84*b* exposed on an exterior of valve cartridge 30.

A plurality of ports 104 extend through housing 64 to provide a flowpath between the exterior of housing 64 and housing chamber 102 located within housing 64. Each of ports 104 is a round aperture that is open on the exterior of housing 64 and connects with housing chamber 102 on the inside of housing 64. The plurality of ports 104 are arrayed circumferentially about housing 64. Housing 64 can include as many or as few port 104 as desired. In some examples, housing 64 includes six ports 104, but it is understood that housing 64 can include other numbers of ports 104. It is further understood that ports 104 can be of any desired shape, such as round or as machined slots.

The plurality of ports 104 are located axially between first groove 106 and second groove 114 and thus between the two o-rings 84*a*, 84*b*. The plurality of ports 104 can be the only ports or other openings that allow fluid flow from the exterior to the interior of valve cartridge 30, except for cartridge outlet 38. During operation, ports 104 are disposed within chamber 58 (FIGS. 2A-2B) within gun body 12. As such, valve cartridge 30 is configured to receive paint from chamber 58 only through ports 104.

Seat 82 is disposed within housing chamber 102 proximate cartridge outlet 38. Seat 82 can be formed from carbide, amongst other material options. Seat 82 is a disk shaped ring with a central aperture. Valve seal 90 is disposed at the front end of slider assembly 68 and is configured to interface with seat 82 to open or close valve 66 of valve cartridge 30. Valve 66, which controls fluid flow out of cartridge outlet 38, is defined by seat 82 and valve seal 90. When valve seal 90 interfaces with seat 82, valve seal 90 seals with the lip of the central aperture of seat 82 to prevent paint from passing from within housing chamber 102 out of cartridge outlet 38. While valve cartridge 30 is described as including seat 82, it is understood that the seat can be formed by housing 64 such that seat is not a separate component. In the illustrated example, valve seal 90 is a ball. It is understood, however, that the ball could be replaced by another type of sealing member, such as a cone. Valve seal 90 can be formed from stainless steel or another type of metal.

Valve seal 90 is held on stem 86 by seal holder 88. In some examples, valve seal 90 can be press fit into seal holder 88. Valve seal 90 can also be soldered onto seal holder 88. Seal holder 88 can be formed from stainless steel or another type of metal. As such, seal holder 88 and valve seal 90 form a seal assembly or valve member configured to control the flow of fluid through cartridge outlet 38.

Stem 86 extends between and connects seal holder 88 and slider 70. Stem 86 is an elongated pin or wire, and stem 86 can be formed from metal, such as stainless steel or another type of metal. It is understood that stem 86 can also or alternatively be referred to as a needle. Stem 86 extends into seal holder 88 and is connected to seal holder 88 by set screw **120*a*, although other types of fixation are possible, such as welding or press fitting. In the illustrated example, set screw 120*a* threads into a cavity within seal holder 88 to engage and clamp onto a forward end of stem 86. The forward end of stem 86 can be crimped to provide a flat surface for set screw 120*a* to engage, though it is understood that the forward end of stem 86 can be of any suitable configuration for being secured within seal holder 88**.

Stem 86 extends from seal holder 88 through seal retainer 74, seal 76, and gland 78 and further out of seal body 72 and into slider 70. Stem 86 extends through a cylindrical cavity within slider 70. Slider 70 is fixed to stem 86 by set screw **120*b*, although other types of fixation between stem 86 and slider 70 can be used, such as welding or press fitting. In the illustrated example, set screw 120*b* threads into a cavity within back end 96 of slider 70 to engage and clamp onto a back end of stem 86. The back end of stem 86 can be crimped to provide a flat surface for set screw 120*b* to engage, though it is understood that the back end of stem 86 can be of any suitable configuration for being secured within and to slider 70**.

Spring 80 is disposed within housing chamber 102 between seal holder 88 and seal retainer 74. Spring 80 engages shoulder 100 of seal holder 88, and a cylindrical projection of seal holder 88 extends inside of spring 80. The end of spring 80 opposite seal holder 88 engages retainer flange 116 of seal retainer 74. A cylindrical projection of seal retainer 74 extends inside of spring 80. Spring 80 is configured to bias seal holder 88 towards cartridge outlet 38 to maintain engagement between valve seal 90 and seat 82. As such, spring 80 is configured to maintain valve 66 in the closed position.

Seal retainer 74 has a cylindrical exterior and extends into a seal bore 110 on the front end of seal body 72. Seal retainer 74 can be fixed to seal body 72. The back end of seal retainer 74 can be attached (e.g., threaded, press fit, glued, or welded) inside seal bore 110 of seal body 72. Seal bore 110 is an annular cavity formed in the front end of seal body 72. Seal retainer 74 captures and retains seal 76 within seal bore 110. A back surface of seal retainer 74 engages a front surface of seal 76 to maintain seal 76 within seal bore 110. A back side of seal 76 engages a front side of gland 78. As shown, the interface between the back side of seal 76 and the front side of gland 78 are complementary, in this case V-shaped. Seal 76 is captured within the annular cavity of seal body 72 between gland 78 and seal retainer 74. As discussed above, stem 86 extends through the cylindrical passage that extends through each of seal body 72, gland 78, seal 76, and seal retainer 74. A sealing interface is formed between the inner cylindrical surface of seal 76 and the outer cylindrical surface of stem 86 to prevent paint inside housing chamber 102 from moving along stem 86 rearward beyond seal 76.

Slider 70 is the rearward-most component of valve cartridge 30, while housing 64 is the forward-most component of valve cartridge 30. Stem 86 overlaps (radially along the axis) with each of slider 70, seal body 72, housing 64, spring 80, seal 76, and seal holder 88. Spring 80 is fully contained within housing 64. O-ring **84*a* prevents paint within chamber 102 of gun body 12 from moving forward along the exterior of valve cartridge 30 within bore 50 of gun body 12 beyond O-ring 84*a*. Similarly, o-ring 84*b* prevents paint within chamber 102 from moving rearward along the exterior of valve cartridge 30 within bore 50 beyond o-ring 84*b***.

During normal operation, paint flows into spray gun 10 via connector 22 (best seen in FIGS. 2A-2B) from a hose, up the filter 43 (best seen in FIGS. 2A-2B) within handle 16 (best seen in FIGS. 2A-2B), through channel 56 (best seen in FIGS. 2A-2B), and into chamber 58 (best seen in FIGS. 2A-2B). The paint flows into housing chamber 102 through ports 104. Ports 104 are the only pathway for paint to move from chamber 58 of bore 50 into housing chamber 102 of valve cartridge 30. O-rings **84*a*, 84*b* prevent leakage of the paint upstream and downstream from chamber 58 within bore 50 of gun body 12 to ensure that all or essentially all of the paint within chamber 58 travels through ports 104 into housing chamber 102. As such, o-rings 84*a*, 84*b* prevent paint from flowing along the exterior of valve cartridge 30 beyond o-rings 84*a*, 84*b*. So long as trigger 14 is in a forward, unactuated position (shown in FIG. 2A), actuator 62 (best seen in FIGS. 2A-2B) is not holding or otherwise pushing slider 70 rearward. In such a state, valve seal 90 is held against seat 82 by spring 80 pushing seal holder 88 forward towards seat 82, such that valve 66 is closed. Valve seal 90 engaging seat 82 prevents paint within housing chamber 102 from flowing through valve 66 and discharging out of housing 64 through cartridge outlet 38**.

When trigger 14 is pulled rearwards to the actuated position (shown in FIG. 2B), arms **34*a*, 34*b* move with trigger 14 and actuator 62 engages trigger seat 98 on back end 96 of slider 70. Actuator 62 pushes slider 70 rearwards. Stem 86 moves rearward with slider 70 due to stem 86 being fixed to slider 70. Stem 86 moves relative to housing 64, seal body 72, gland 78, seal 76, seal retainer 74, and seat 82. The rearward movement of stem 86 pulls back seal holder 88, which in turn pulls valve seal 90 off of seat 82. Pulling valve seal 90 off of seat 82 opens a flowpath through valve 66 to allow paint within housing chamber 102 to move past valve 66 and be discharged from valve cartridge 30 through cartridge outlet 38. Paint continues to flow past valve 66 and out of cartridge outlet 38 until trigger 14** is released.

While slider 70 moves rearwards, housing 64 is maintained in a fixed position with respect to gun body 12 by exterior threading 108 on housing 64 engaging with threading on the interior of bore 50 of gun body 12. In some examples, exterior threading 108 is the only part of valve cartridge 30 that fixes valve cartridge 30 to gun body 12. Exterior threading 108 can also be the only external threading of valve cartridge 30. As such, all other components of valve cartridge 30 are not threaded directly to gun body 12 or other parts of spray gun 10. It is understood that exterior threading 108 can be located at any desired location along the axial length of valve cartridge 30. In some examples, exterior threading 108 can be located on seal body 72 of valve cartridge 30.

While valve cartridge 30 is described as including exterior threading 108, it is understood that, in some examples, housing 64 is prevented from moving rearward with respect to gun body 12 by a narrowing of the exterior surface of valve cartridge 30 fitting into and engaging a narrowing interior surface of bore 50. In some examples, housing 64 and seal body 72 can each correspondingly narrow with the narrowing of bore 50 to prevent rearward movement of housing 64 and seal body 72 when slider assembly 68 is moved rearward relative to housing 64 and seal body 72.

When trigger 14 is released, actuator 62 releases from the trigger seat 98, removing the rearward force from slider 70. Spring 80 pushes seal holder 88 forward relative to housing 64 to drive valve seal 90 back to the closed position where valve seal 90 is engaged with seat 82. Valve 66 is thereby closed such that valve 66 prevents paint within housing chamber 102 from moving past valve 66 and out through cartridge outlet 38. Spring 80 pushing seal holder 88 forward also causes slider 70 to move forward and reset to its initial position due to stem 86 extending between and connecting seal holder 88 and slider 70. Valve 66 can be opened and closed by actuation of trigger 14 to selectively spray paint when desired by the user.

Valve cartridge 30 provides significant advantages. Valve cartridge 30 contains all of the wear components of spray gun 10. Paint and other fluids sprayed by spray gun 10 can be abrasive and cause wear, particularly on those components controlling the flow of the paint, such as valve seal 90, seat 82, stem 86, and seal 76. With all of the wear parts located within valve cartridge 30, replacing valve cartridge 30 also replaces all of the wear components of spray gun 10, providing the user with a "like new" spray gun 10. Valve cartridge 30 can be removed from gun body 12 as a single piece. More specifically, a user can hold grip surface 36 while valve cartridge 30 is disposed within bore 50 of gun body 12 and can pull grip surface 36 forward (after rotating valve cartridge 30 to disengage exterior threading 108 in examples where exterior threading 108 is present). Pulling grip surface 36 forward pulls the entire valve cartridge 30 out of bore 50 and out of the front end of gun body 12. Seal body 72, stem 86, and slider 70 are not separately attached to gun body 12 or any other part of spray gun 10. Instead, the various other components of valve cartridge 30 are attached to gun body 12 via housing 64. Due to the attachment of seal body 72 and slider assembly 68 to housing 64, these components, and all components of valve cartridge 30, slide out of bore 50 of gun body 12 as a single piece when housing 64 is pulled forward out of bore 50.

As discussed in more detail below, actuator 62 must be disengaged from trigger seat 98 before valve cartridge 30 is allowed to move forward through bore 50. During normal operation, actuator 62 is held near and/or against trigger seat 98, thereby preventing slider 70 from moving forward past actuator 62. As such, actuator 62 retains valve cartridge 30 within bore 50 and is positioned to push on trigger seat 98 to pull valve seal 90 off of seat 82 in response to trigger 14 actuation. More specifically, trigger seat 98 is wide enough, and neck 94 is narrow enough, such that when trigger 14 is in either the actuated or unactuated states, actuator 62 obstructs movement of slider 70 in the forward direction by engaging trigger seat 98. As such, actuator 62 prevents removal of valve cartridge 30 from bore 50. To remove valve cartridge 30, actuator 62 is lifted out of the way of slider 70 to disengage actuator 62 from trigger seat 98 and allow slider 70 to be moved forward through void 54 and into bore 50 past actuator 62.

Figure 4B:
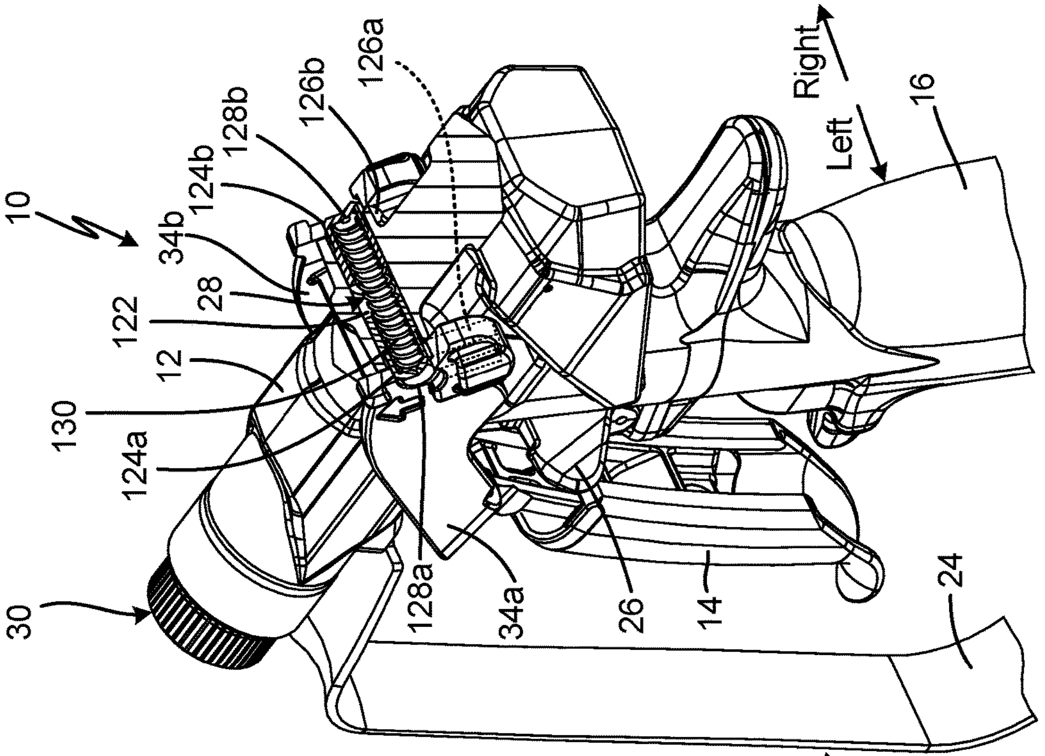
FIG. 4B is an isometric cross-sectional view of a spray gun taken along line 4-4 in FIG. 1A, showing a pivot mechanism in a disengaged state.
Figure 4A:
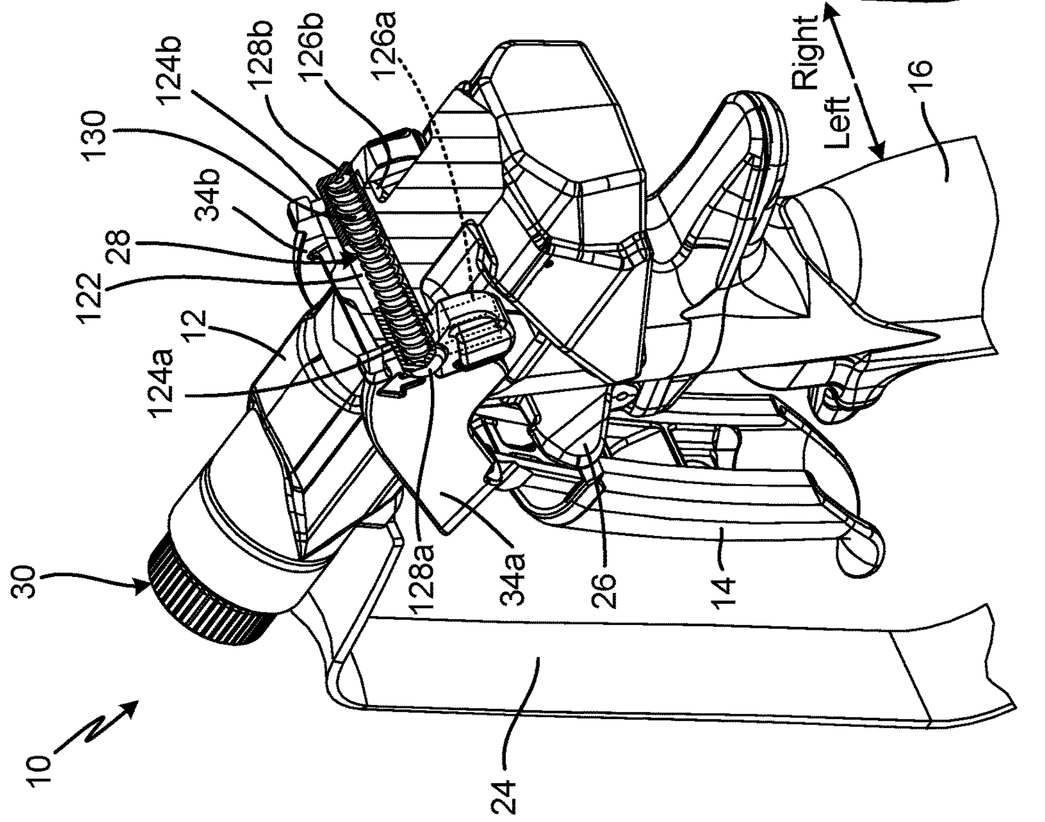
FIG. 4A is an isometric cross-sectional view of a spray gun taken along line 4-4 in FIG. 1A, showing a pivot mechanism in an engaged state.

FIG. 4A is a perspective cross-sectional view of spray gun 10 taken along line 4-4 in FIG. 1A showing pivot mechanism 28 in an engaged state. FIG. 4B is a perspective cross-sectional view of spray gun 10 taken along line 4-4 in FIG. 1A showing pivot mechanism 28 in a disengaged state. FIGS. 4A and 4B will be discussed together. Gun body 12, trigger 14, handle 16, trigger guard 24, safety 26, pivot mechanism 28, and valve cartridge 30 of spray gun 10 are shown. Gun body 12 includes cross-bore 122. Arms **34*a*, 34*b* of trigger 14 are shown. Arms 34*a*, 34*b* respectively include apertures 124*a*, 124*b* and slots 126*a*, 126*b*. Pivot mechanism 28 includes detents 128*a*, 128*b* and pivot spring 130**.

As discussed above with regard to FIG. 3, actuator 62 (best seen in FIGS. 2A-2B) is disengaged from trigger seat 98 (FIG. 3) to allow removal of valve cartridge 30 from bore 50 (best seen in FIGS. 2A-2B) of gun body 12. Cross-bore 122 extends through gun body between the left and right lateral sides of gun body 12. Pivot mechanism 28 is disposed within cross-bore 122. Detents **128*a*, 128*b* are disposed within cross-bore 122 on opposite lateral sides of cross-bore 122. Pivot spring 130 is disposed within cross-bore 122 and extends between detents 128*a*, 128*b*. Pivot spring 130 is configured to bias detents 128*a*, 128*b* out of cross-bore and through apertures 124*a*, 124*b* in arms 34*a*, 34*b*. In some examples, each detent 128*a*, 128*b* is formed as an open-ended cylinder such that pivot spring 130 extends into a cavity of each detent 128*a*, 128*b*. It is understood, however, that detents 128*a*, 128*b* can be of any desired configuration. Slots 126*a*, 126*b* are disposed in arms 34*a*, 34*b*, respectively, and each slot 126*a*, 126*b* extends from a bottom of each arm 34*a*, 34*b* to the aperture 124*a*, 124*b* in each arm 34*a*, 34*b*. It is understood that slots 126*a*, 126*b* can extend any desired distance along arms 34*a*, 34*b*, including past apertures 124*a*, 124*b***.

Detents **128*a*, 128*b* are round to match the profile of apertures 124*a*, 124*b*. Arms 34*a*, 34*b* are mounted on detents 128*a*, 128*b* and pivot around detents 128*a*, 128*b* with detents 128*a*, 128*b* extending through apertures 124*a*, 124*b*. As such, arms 34*a*, 34*b* are attached to gun body 12 by pivot mechanism 28. Arms 34*a*, 34*b* are configured to rotate about detents 128*a*, 128*b* with respect to gun body 12 when trigger 14** is actuated and released.

The force of pivot spring 130 can be overcome by the user pushing in each of detents **128*a*, 128*b* (such as by pinching both detents 128*a*, 128*b* with two fingers on one hand). Each of detents 128*a*, 128*b* can be pushed laterally inward with respect to gun body 12 past the inner edges of apertures 124*a*, 124*b*. As such, the cross-sectional width of pivot mechanism 28 is decreased as the user pushes detents 128***a*, 128*b* in past the inner edges of apertures 124*a*, 124*b*. With detents 128*a*, 128*b* no longer extending through apertures 124*a*, 124*b*, detents 128*a*, 128*b* no longer secure arms 34*a*, 34*b* to gun body 12. Arms 34*a*, 34*b* are thus detached from pivot mechanism 28, such that arms 34*a*, 34*b* can be slid upwards relative to detents 128*a*, 128*b*.

The upward sliding of arms 34*a*, 34*b* shifts the entire trigger 14, including actuator 62, upwards and slightly forward relative to gun body 12. During the sliding, pivot spring 130 continues to bias detents 128*a*, 128*b* laterally outward such that each detent 128*a*, 128*b* pushes against the outer wall of each slot 126*a*, 126*b* formed on the upper portions of arms 34*a*, 34*b*. Trigger 14 can thus be slid into a repair position (shown in FIG. 5A), which can also be referred to as a disengaged or up position. Detents 128*a*, 128*b* can maintain trigger 14 in the repair position due to the spring force exerted on arms 34*a*, 34*b* by detents 128*a*, 128*b* and pivot spring 130. In some examples, cavities can be located along slots 126*a*, 126*b* for detents 128*a*, 128*b* to push into and hold arms 34*a*, 34*b* in place. As such, the cavities can form one or more stop points where trigger 14 is secured relative to gun body 12, in addition to the stop points where detents 128*a*, 128*b* extend through apertures 124*a*, 124*b*.

Trigger 14 can be easily installed on spray gun 10 as a single part. To install trigger 14, spray tip 20 (best seen in FIGS. 1A-1B) is initially removed from gun body 12. Front end 46 (FIGS. 2A-2B) of gun body 12 is positioned in the opening defined between arms 34*a*, 34*b* and between actuator 62 (best seen in FIGS. 2A-2B) and upper trigger portion 132 (best seen in FIGS. 7A, 9A, and 9B). The entire trigger 14 is shifted axially rearward until actuator 62 is aligned with void 54 and detents 128*a*, 128*b* are aligned with slots 126*a*, 126*b*. Trigger 14 is then shifted downwards and rearwards to cause pivot mechanism 28 to engage with slots 126*a*, 126*b*. Trigger 14 can continue to shift downward and rearward until detents 128*a*, 128*b* engage with apertures 124*a*, 124*b*, thereby putting trigger in a spray position. Trigger 14 is thus installed on spray gun 10 and can be used to initiate spraying. Installation of trigger 14 on spray gun 10 can be tool-less, in that installation can be done by hand without a tool. The user remove tip mount 18 by hand and can decrease the cross-sectional width of pivot mechanism 28 with the user's hands by pinching detents 128*a*, 128*b*. The user can slide trigger 14 onto spray gun 10 and position pivot mechanism 28 within slots 126*a*, 126*b* by hand. With trigger 14 installed on spray gun 10, the user can actuate trigger 14 between the spray position and the repair position. In some examples, the lower ends of slots 126*a*, 126*b* can be capped to complete installation.

Figure 5A:
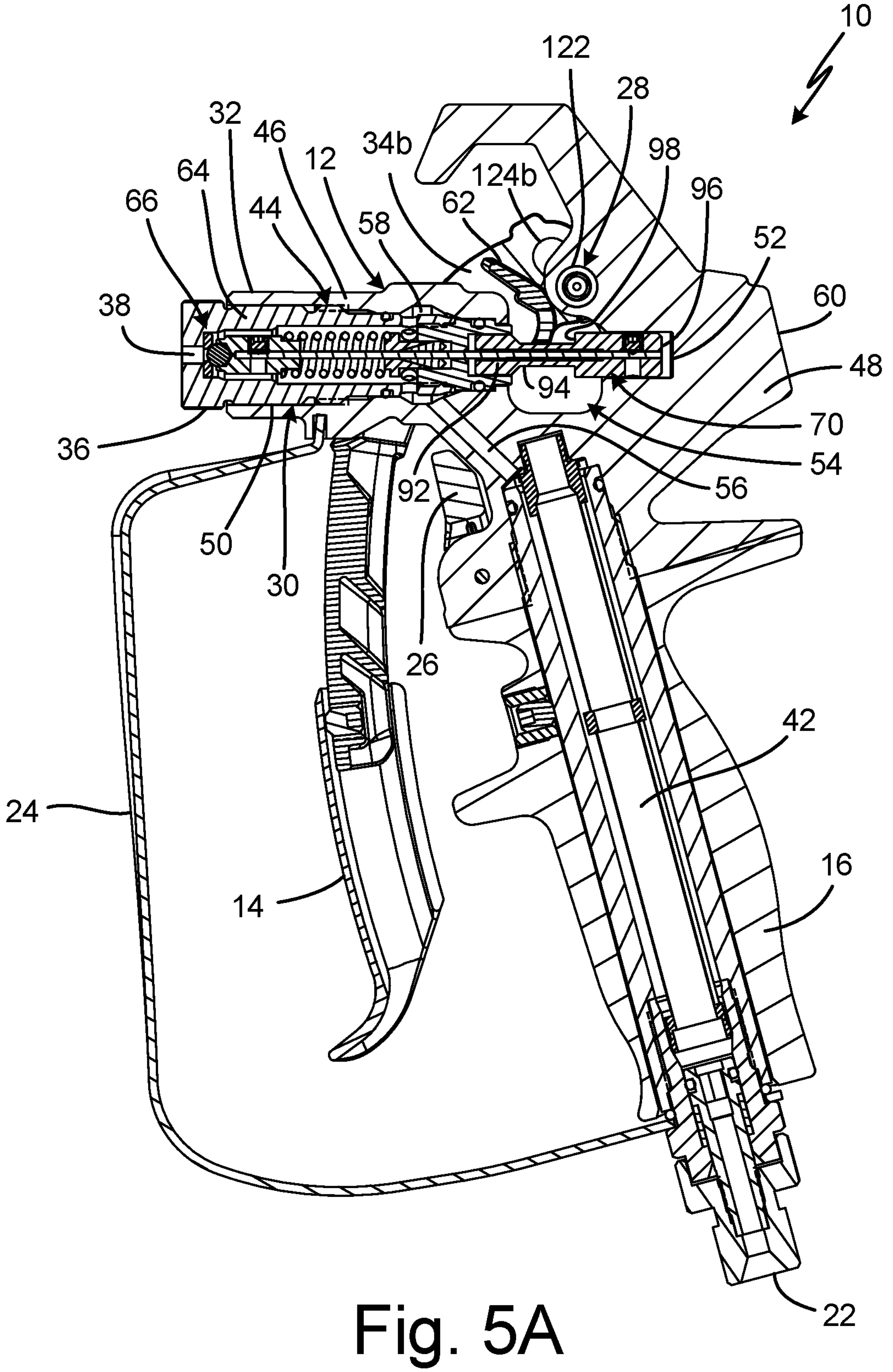
FIG. 5A is a cross-sectional view of a spray gun showing the trigger in a repair position.
Figure 5B:
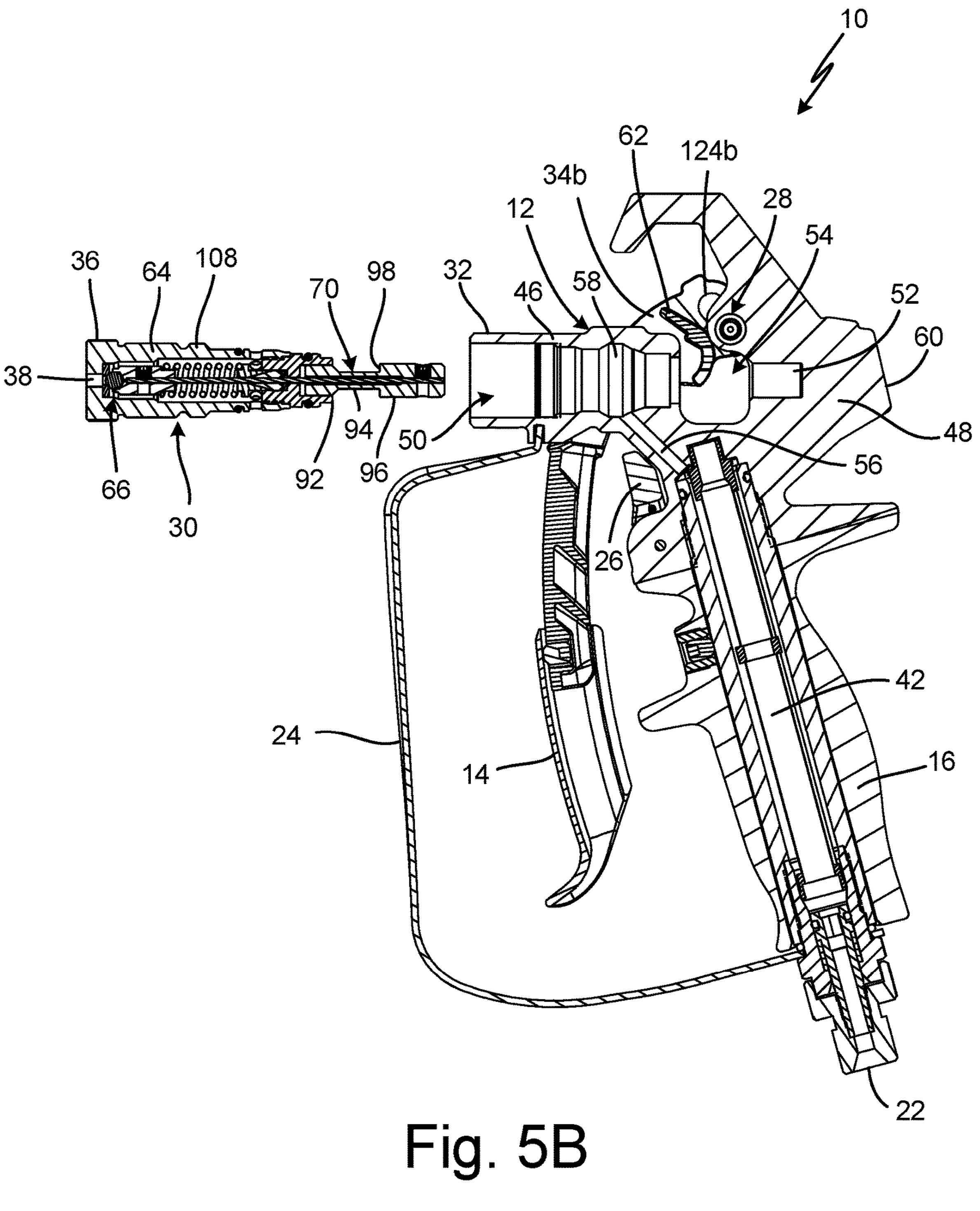
FIG. 5B is a partially exploded cross-sectional view of a spray gun.
Figure 5C:
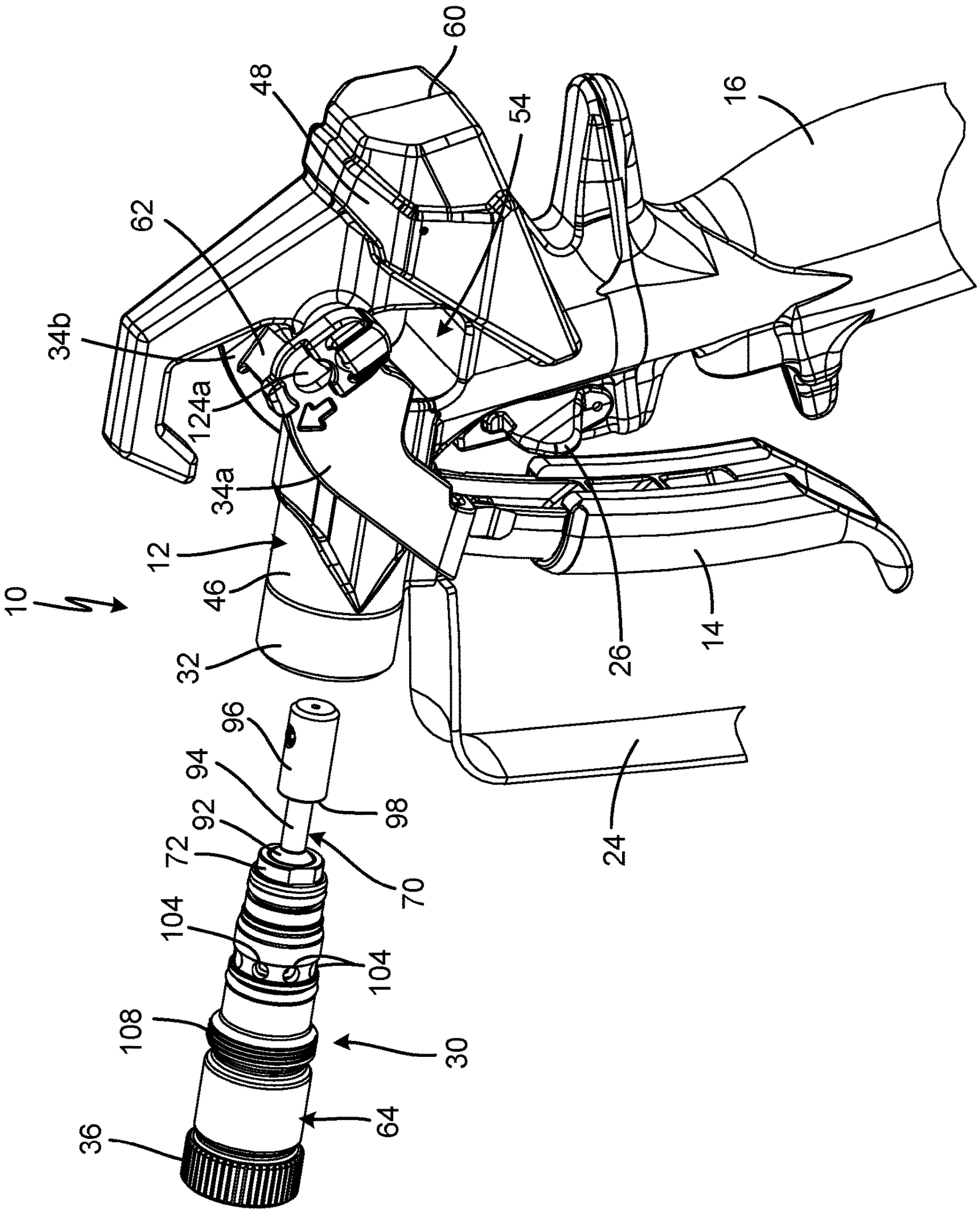
FIG. 5C is a partially exploded isometric view of a spray gun.

FIG. 5A is a cross-sectional view of spray gun 10 showing trigger 14 in the repair position. FIG. 5B is a partially exploded cross-sectional view of spray gun 10. FIG. 5C is an isometric exploded view of spray gun 10 and valve cartridge 30. FIGS. 5A-5C will be discussed together. Spray gun 10 includes gun body 12, trigger 14, handle 16, connector 22, trigger guard 24, safety 26, pivot mechanism 28, valve cartridge 30, inlet passage 42, and threaded interface 44. Gun body 12 includes mounting surface 32, front end 46, back end 48, bore 50, cylindrical cavity 52, void 54, channel 56, chamber 58, and back side 60. Trigger 14 includes arms 34*a*, 34*b* and actuator 62. Valve cartridge 30 includes housing 64, valve 66, slider 70, and seal body 72. Housing 64 includes grip surface 36, cartridge outlet 38, ports 104, and exterior threading 108. Slider 70 includes front end 92, neck 94, and back end 96. Back end 96 includes trigger seat 98. Apertures 124*a*, 124*b* of arms 34*a*, 34*b* are shown.

As discussed above with regard to FIGS. 4A-4B, trigger 14 is slid to a repair position to facilitate installation and removal of valve cartridge 30 from spray gun 10. Arms 34*a*, 34*b* are mounted to gun body 12 at pivot mechanism 28. Valve cartridge 30 is disposed within bore 50 of gun body 12. Slider 70 extends out the back side of bore 50, spans void 54, and extends into chamber 52. Back end 48 of slider 70 is disposed within and movable within chamber 52. Neck 94 extends between and connects front end 46 and back end 48 of slider 70. Valve 66 is disposed within valve cartridge 30 and is configured to control paint flow through cartridge outlet 38. Actuator 62 extends between arms 34*a*, 34*b* and is configured to be disposed within void 54 and to interface with trigger seat 98 of slider 70 when trigger 14 is in the spraying position.

As discussed above, pivot mechanism 28 can be pinched to reduce the cross-sectional width of pivot mechanism 28 and disengage detents 128*a*, 128*b* (FIGS. 4A-4B) from apertures 124*a*, 124*b*. With detents 128*a*, 128*b* disengaged from apertures 124*a*, 124*b*, trigger 14 can be moved upwards and slightly forwards to disengage actuator 62 from trigger seat 98. Detents 128*a*, 128*b* move within slots 126*a*, 126*b* (FIGS. 4A-4B) in arms 34*a*, 34*b* and can exert an outward force on arms 34*a*, 34*b* within slots 126*a*, 126*b* to maintain trigger 14 in the repair position. With trigger 14 in the repair position, actuator 62 has moved away from neck 94 and the rest of slider 70. As such, shifting trigger 14 upwards and slightly forwards removes actuator 62 from the space surrounding neck 94 such that actuator 62 does not interfere with forward movement of slider 70.

With actuator 62 in this "up" or "disengaged" position, actuator 62 no longer blocks slider 70 or any other part of the valve cartridge 30 from moving forward. In contrast, with actuator 62 being in the "lower" or "engaged" position, actuator 62 does extend into the depression defined by neck 94 and is disposed directly between the wider front end 92 and back end 96 of slider 70. In the lower position, actuator 62 prevents forward movement of slider 70 by engaging trigger seat 98, and thereby prevents forward movement of the rest of valve cartridge 30 to which slider 70 is connected. Actuator 62 being in the up or disengaged position does not block, and therefore allows, slider 70 to move forward past actuator 62. As such, with actuator 62 in the up or disengaged position, valve cartridge 30 can be removed from bore 50 of gun body 12 by pulling valve cartridge 30 axially forward through and out of bore 50. In examples where threaded interface 44 fixes cartridge valve 66 within bore 50, valve cartridge 30 can be rotated via a user grasping grip surface 36 to unscrew valve cartridge 30 until exterior threading 108 on housing 64 disengages from threading within bore 50. With the threaded interface 44 between valve cartridge 30 and gun body 12 disengaged, valve cartridge 30 can be removed from bore 50 via a linear forward sliding motion to entirely remove valve cartridge 30 from bore 50. It is noted that the linear sliding of valve cartridge 30 through bore 50 is an axial sliding motion along axis A-A of valve cartridge 30. Valve cartridge 30 is thus pulled from the position shown in FIG. 5A to the position shown in FIGS. 5B and 5C, where valve cartridge 30 is fully removed from gun body 12.

All components of valve cartridge 30 are removed together as a single piece and do not require separate removal from bore 50 of gun body 12. The various components of valve cartridge 30 are connected to each other independent of gun body 12 and other parts of spray gun 10.

For example, the various components of valve cartridge 30 can be threaded or press fit to hold the components together, such that the components stay together regardless of the orientation of valve cartridge 30 (e.g., the components do not freely slide apart). As such, valve cartridge 30 remains a unitary part when outside of gun body 12 such that the various components of valve cartridge 30 do not freely separate.

It is understood that, in some examples, valve cartridge 30 can be serviced once removed from bore 50, as some embodiments may allow for nondestructive opening of the valve cartridge 30 for servicing. Valve cartridge 30 can be disposed of in examples where the internal components within valve cartridge 30 are locked inside fixed components (such as housing 64 and seal body 72 (FIG. 3)) and may not be accessed without destruction of the one or more components of valve cartridge 30. The user can then bring spray gun 10 back into service by installing a new or serviced valve cartridge 30. The new or serviced valve cartridge 30 can be axially inserted into bore 50 of gun body 12 to sit and function in the same manner as the valve cartridge 30 that was previously removed.

During installation of valve cartridge 30, trigger 14, and thus actuator 62, is placed and/or maintained in the repair position. With actuator 62 in the disengaged or up position, sufficient clearance is provided in void 54 to allow slider 70 to pass out of bore 50, through void 54, and into cylindrical cavity 52. Valve cartridge 30 is slid into bore 50 through the front end of bore 50, with slider 70 being the first portion of valve cartridge 30 inserted into bore 50. Valve cartridge 30 is slid axially backwards through void 54 until back end 96 of slider 70 is disposed at least partially within cylindrical cavity 52. In examples where valve cartridge 30 is secured by threaded interface 44, valve cartridge 30 can be rotated to engage exterior threading 108 with threading inside of bore 50, thereby engaging threaded interface 44 between valve cartridge 30 and bore 50. With valve cartridge 30 installed within bore 50, tip mount 18 (best seen in FIGS. 1A-1B) can then be reattached to gun body 12 at mounting surface 32.

Once a new or serviced valve cartridge 30 has been inserted into and secured within bore 50, trigger 14 is returned to the spray position (FIGS. 2A-2B) from the repair position. Trigger 14 can be pulled or arms 34*a*, 34*b* can be pushed downwards and slightly backwards so detents 128*a*, 128*b* slide in slots 126*a*, 126*b* until detents 128*a*, 128*b* reengage with apertures 124*a*, 124*b*. For example, pivot spring 130 (FIGS. 4A-4B) can cause detents 128*a*, 128*b* to automatically pass through and engage apertures 124*a*, 124*b* when detents 128*a*, 128*b* are aligned with apertures 124*a*, 124*b*. With detents 128*a*, 128*b* extending through apertures 124*a*, 124*b*, arms 34*a*, 34*b*, and thus trigger 14, are fixed to gun body 12. Pivot mechanism 28 limits movement of trigger 14 to rotational motion about pivot mechanism 28.

In moving arms 34*a*, 34*b* down and back from the repair position to the spray position, actuator 62 moves back into the space surrounding neck 94, such that actuator 62 is disposed between front end 92 and back end 96 of slider 70. In such a position, actuator 62 can engage trigger seat 98 formed on back end 96. Actuator 62 is thus in a position to push slider 70 rearwards when trigger 14 is pulled. Pulling trigger 14 causes actuator 62 to apply a rearward force to trigger seat 98, causing slider 70 to move rearward within cylindrical cavity 52 along spray axis A-A. Rearward movement of slider 70 opens valve 66 in valve cartridge 30. A flowpath through cartridge outlet 38 out of housing 64 is thereby created and paint can flow out of valve cartridge 30, through valve 66 and cartridge outlet 38, to be sprayed from spray gun 10.

In some examples, removal and reinsertion of valve cartridge 30 from gun body 12 is tool-less. Removal of tip mount 18 from gun body 12 (by unthreading) and then removal of valve cartridge 30 from gun body 12 (by unthreading and axial pulling) can be done by hand without a tool. Installation of valve cartridge 30 (by axial movement and threading) and installation of tip mount 18 (by threading) can also be done by hand without a tool. Installation can include the reverse steps from removal.

In some examples, exterior threading 108 is the only part of valve cartridge 30 that fixes valve cartridge 30 to gun body 12. Exterior threading 108 can also be the only external threading of valve cartridge 30. As such, all other components of valve cartridge 30 are not threaded directly to gun body 12 or other parts of spray gun 10. It is understood that exterior threading 108 can be located at any desired location along the axial length of valve cartridge 30. For example, while exterior threading 108 is shown as located forward of chamber 58 in bore 50, exterior threading 108 can be located on valve cartridge 30 such that threaded interface 44 is formed at a location rearward of chamber 58 in bore 50. Where threaded interface 44 is located rearward of chamber 58, it is understood that that exterior threading 108 may still be the only threading located on the exterior of valve cartridge 30.

Valve cartridge 30 (and all components thereof) is removed from gun body 12 by being moved only in an axial forward direction through bore 50. Valve cartridge 30 is removed from spray gun 10 only by forward movement (and rotation in examples where exterior threading 108 is present), not from rearward or sideways movement, or from separation of the components of valve cartridge 30. Such removal differs from various other spray guns in which the spray valve and associated actuating, sealing, and fixing components are removed in different directions and/or not as a single piece. For example, in such other designs, some components are removed through a front end opening of a bore and some other components are removed through a rear end opening of the same or a different bore. In spray gun 10, back side 60 of gun body 12 is closed and does not include any apertures that provide access to valve cartridge 30 or other parts of valve cartridge 30. In back end 48 there are no pathways through gun body 12 to valve cartridge 30, and to slider 70 in particular. Various other spray guns include an open pathway that is open on the back side (similar to back side 60) of the gun body to either unscrew part of the trigger and/or valve, and or to allow an elongated tool (e.g., a hex key or screwdriver) to be inserted through the pathway to push the part out of the front of the gun body and/or to pull the part out of the back of the gun body. There is no need for such access to valve cartridge 30 from back side 60. Instead, valve cartridge 30 can be axially inserted into and axially removed from bore 50 as a single component and in a single direction. By including the actuation, valve, and sealing components in a unitary valve cartridge 30, no passage is needed on back side 60 of gun body 12 to access valve cartridge 30.

Furthermore, valve cartridge 30, and all components of valve cartridge 30, is removable from gun body 12 without removal or detachment of trigger 14 and arms 34*a*, 34*b* from gun body 12. Pivot mechanism 28 maintains the connection between trigger 14 and gun body 12 during installation and removal of valve cartridge 30. Detents 128*a*, 128*b* (and/or other components) maintain engagement with arms 34*a*, 34*b* even when detents 128*a*, 128*b* are disengaged from apertures 124*a*, 124*b*. As such, detents 128*a*, 128*b* maintain the connection between arms 34*a*, 34*b* and gun body 12. Therefore, even when arms 34*a*, 34*b* and actuator 62 are moved to the up, disengaged position to facilitate removal of valve cartridge 30, trigger 14 and arms 34*a*, 34*b* remain attached to gun body 12. In addition, no components (except for tip mount 18 holding tip 20), such as screws, bolts, or pins, need to be removed from spray gun 10 to completely remove and replace valve cartridge 30.

Figures 6A, 6B, 6C:
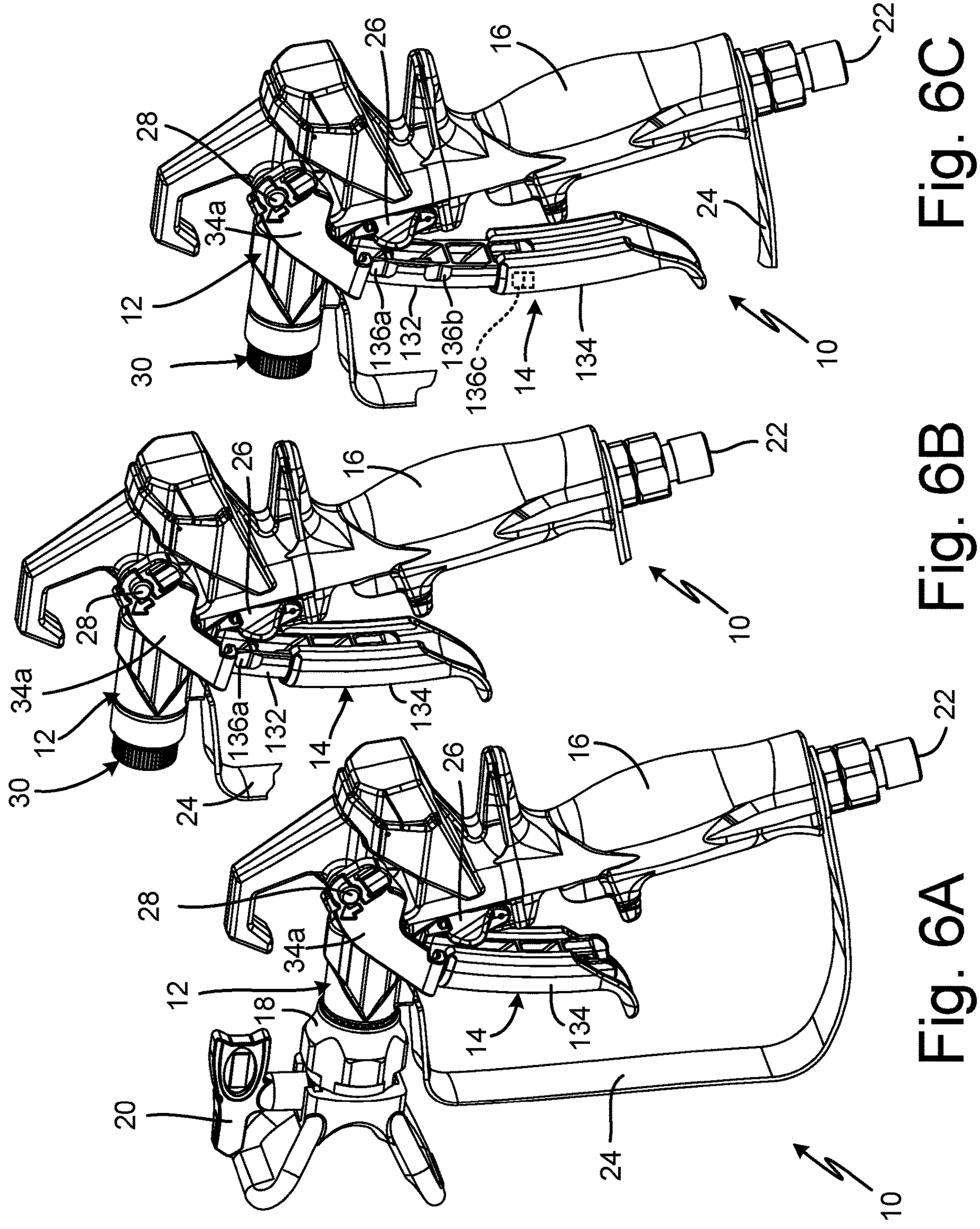
FIG. 6A is an isometric view of a spray gun showing the trigger in a first position.
FIG. 6B is an isometric view of a spray gun showing the trigger in a second position.
FIG. 6C is an isometric view of a spray gun showing the trigger in a third position.

FIG. 6A is an isometric view of spray gun 10 showing trigger 14 in a first position. FIG. 6B is an isometric view of spray gun 10 showing trigger 14 in a second position. FIG. 6C is an isometric view of spray gun 10 showing trigger 14 in a third position. FIGS. 6A-6C will be discussed together. Gun body 12, trigger 14, handle 16, connector 22, trigger guard 24, safety 26, pivot mechanism 28, and valve cartridge 30 of spray gun 10 are shown. Tip mount 18 and tip 20 are shown in FIG. 6A. Trigger 14 includes arms 34*a*, 34*b* (only arm 34*a* is shown); upper trigger portion 132; and lower trigger portion 134. Upper trigger portion 132 includes indexes 136*a*-136*c*.

Handle 16 is attached to gun body 12 and is configured to be grasped and manipulated by a single hand of a user. Connector 22 extends into handle 16 and is configured to connect to a hose to receive paint from the hose and provide the paint to the flowpath extending through handle 16. Valve cartridge 30 is mounted within gun body 12 and is configured to control spraying of paint by spray gun 10. Tip mount 18 is attached to gun body 12 and extends over a portion of valve cartridge 30 projecting from gun body 12. Safety 26 is pivotably attached to handle 16.

Trigger 14 is mounted on gun body 12 by pivot mechanism 28. Trigger 14 is configured to pivot about pivot mechanism 28 to open and close the valve of valve cartridge 30 and initiate and cease spraying by spray gun 10. Arms 34*a*, 34*b* extend from opposite lateral sides of upper trigger portion 132 and are mounted to gun body 12 at pivot mechanism 28. In some examples, arms 34*a*, 34*b* are integrally formed with upper trigger portion 132 such that arms 34*a*, 34*b* and upper trigger portion 132 form a unitary assembly. In other examples, arms 34*a*, 34*b* can be formed separately and attached to upper trigger portion 132 in any desired manner, such as by fasteners or more permanently by adhesive or welding. In some examples, upper trigger portion 132 is formed from metal, such as aluminum or stainless steel.

Lower trigger portion 134 partially surrounds and slides over upper trigger portion 132. Lower trigger portion 134 is configured to slide along the length of upper trigger portion 132 to adjust a length of trigger 14. Each of lower trigger portion 134 and upper trigger portion 132 can be curved along their respective lengths. Indexes 136*a*-136*c* are arrayed along the length of upper trigger portion 132. Indexes 136*a*-136*c* correspond to the various trigger positions and are configured to assist in maintaining trigger 14 in a desired position and at a desired length. For example, indexes 136*a*-136*c* can be notches formed in the sides of upper trigger portion 132. While trigger 14 is shown as including three indexes 136*a*-136*c*, it is understood that trigger 14 can include as many or as few indexes 136*a*-136*c* as desired. It is further understood that trigger 14 can include a single array of indexes 136*a*-136*c* located on one lateral side of trigger 14, or trigger 14 can include complementary arrays of indexes 136*a*-136*c* located on both lateral sides of trigger 14.

In some examples, lower trigger portion 134 can include one or more projections, such as stop 148 (FIG. 7B), configured to engage with indexes 136*a*-136*c* to assist in maintaining lower trigger portion 134 at a desired location along upper trigger portion 132. Lower trigger portion 134 can be formed from any desired material, such as polymer, such as polyethylene or polyurethane, or from a metal.

Trigger 14 is adjustable between the first position, second position, and third position, such that trigger 14 can be different lengths. The different lengths can create different lever arm distances relative to pivot mechanism 28, with a longer trigger 14 providing a greater lever arm, and space for more fingers, to actuate trigger 14, thereby providing for easier actuation of trigger 14. Lower trigger portion 134 can be pulled lengthwise along upper trigger portion 132 to lengthen trigger 14 from the first position shown in FIG. 6A, corresponding to a two finger trigger state, to the second position shown in FIG. 6B, corresponding to a three finger trigger state, and finally to the third position shown in FIG. 6C, corresponding to a four finger trigger state. The positions are referred to by number of fingers, as those are the number of fingers that trigger 14 is typically capable of accommodating in the various positions. The more fingers that the user can place on trigger 14, the more force the user can apply to actuate trigger 14. Additionally and/or alternatively, the four finger state allows the user to grasp handle 16 closer to connector 22, which allows the user to extend gun body 12 further away from the user to better position spray gun 10 for spraying. For example, where the user is spraying a high portion of a wall that is difficult for the user to reach. As such, the user can more easily actuate trigger 14 with spray gun 10 in a desired spraying position.

With trigger 14 in the first position, lower trigger portion 134 is disposed on upper trigger portion 132 to fully cover the front side of upper trigger portion 132. As such, the user may not press on or contact upper trigger portion 132. With trigger 14 in the second position, lower trigger portion 134 is spaced to partially cover the front side of upper trigger portion 132 such that the user may contact the front sides of both upper trigger portion 132 and lower trigger portion 134. For example, the user may contact lower trigger portion 134 with two fingers while the user contacts upper trigger portion 132 with one finger. With trigger 14 in the third position, lower trigger portion 134 is spaced to partially cover the front side of upper trigger portion 132 such that the user may contact the front sides of both upper trigger portion 132 and lower trigger portion 134. For example, the user may contact lower trigger portion 134 with two fingers and may contact upper trigger portion 132 with two different fingers. Alternatively, the user may contact lower trigger portion 134 without contacting upper trigger portion 132 as the user grasps a lower portion of handle 16 proximate connector 22. In some examples, the length of each of lower trigger portion 134 and upper trigger portion 132 can be at least one inch, respectively. In some examples, the length of lower trigger portion 134 can be around two inches, or greater than two inches.

Figure 7B:
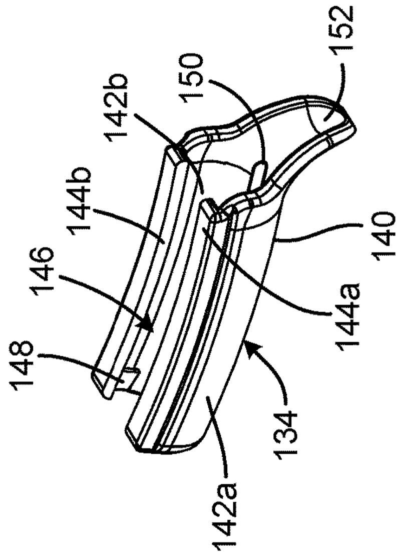
FIG. 7B is an isometric view of a lower trigger portion.
Figure 7A:
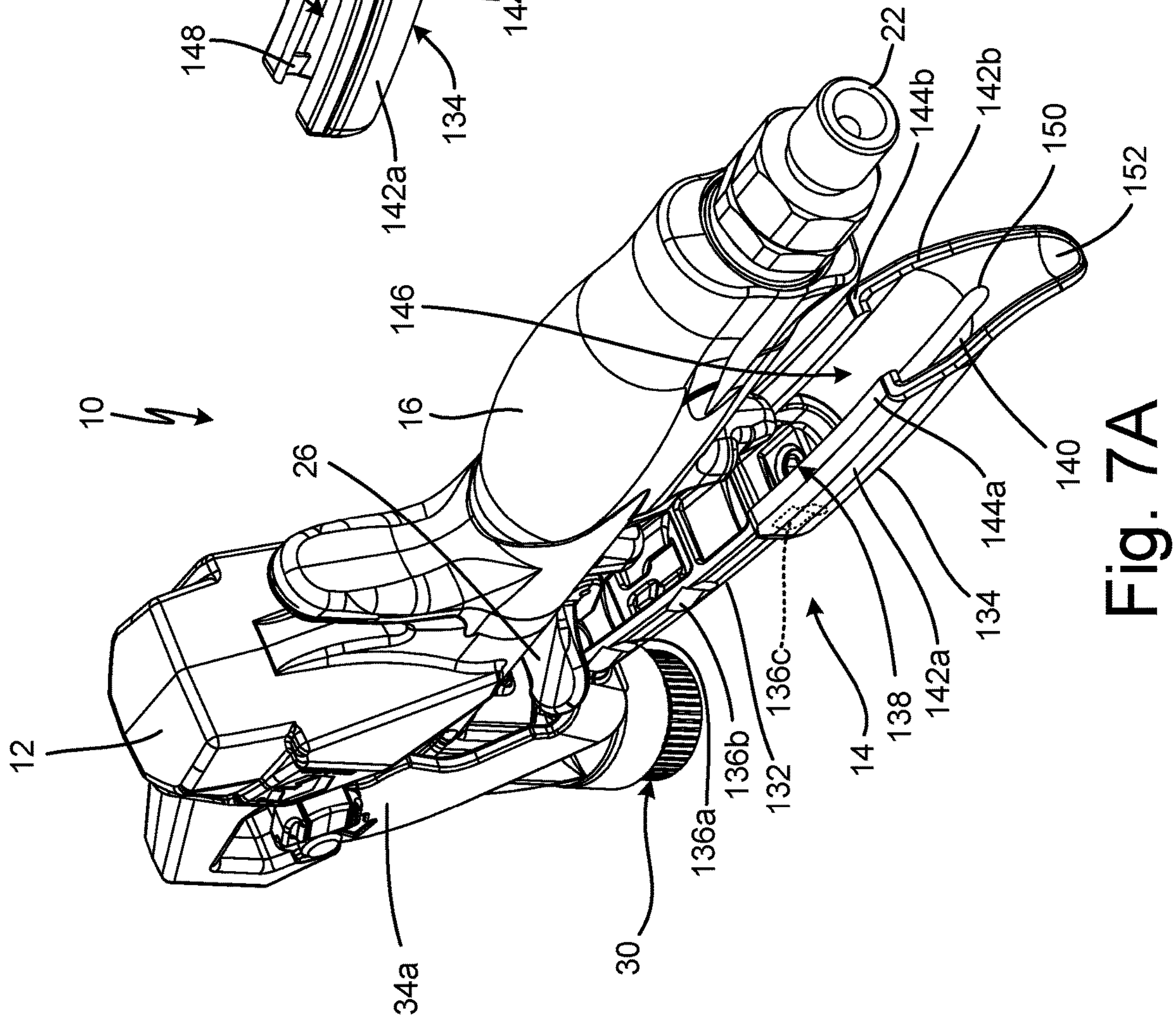
FIG. 7A is an isometric view of a spray gun.

FIG. 7A is an isometric view of spray gun 10. FIG. 7B is an isometric view of lower trigger portion 134 of trigger 14. FIGS. 7A and 7B will be discussed together. Gun body 12, trigger 14, handle 16, connector 22, safety 26, and valve cartridge 30 of spray gun 10 are shown. Arm 34*a*, upper trigger portion 132, lower trigger portion 134, and fastening mechanism 138 of trigger 14 are shown. Upper trigger portion 132 includes indexes 136*a*-136*c*. Lower trigger portion 134 includes front side 140; lateral sides 142*a*, 142*b*; brackets 144*a*, 144*b*; gap 146; stop 148; groove 150; and curved portion 152.

Trigger 14 is pivotably mounted to gun body 12 and is configured to control spraying by spray gun 10. Lower trigger portion 134 is disposed on and supported by upper trigger portion 132. Lower trigger portion 134 is slidable along the length of upper trigger portion 132 to adjust the length of trigger 14. Brackets 144*a*, 144*b* wrap partially around upper trigger portion 132 and form a track within which upper trigger portion 132 slides relative to lower trigger portion 134. Brackets 144*a*, 144*b* can extend parallel to each other on the backside of lower trigger portion 134.

Lower trigger portion 134 includes front side 140 that the user's fingers engage. Front side 140 at least partially covers the front side of upper trigger portion 132. Lower trigger portion 134 further includes lateral sides 142*a*, 142*b* extending from front side 140. Lateral sides 142*a*, 142*b* at least partially cover the lateral sides of upper trigger portion 132. Brackets 144*a*, 144*b* of lower trigger portion 134 extend from the ends of lateral sides 142*a*, 142*b* and further wrap around the back side of upper trigger portion 132. Gap 146 is defined between brackets 144*a*, 144*b* and is open such that a user can access fastening mechanism 138 through gap 146. As such, lower trigger portion 134 does not fully cover the back side of upper trigger portion 132. In this way, lower trigger portion 134 wraps entirely around the front and lateral sides of upper trigger portion 132, but only partially wraps around and covers the back side of upper trigger portion 132.

Gap 146 is an elongate opening defined between brackets 144*a*, 144*b*. Fastening mechanism 138, or another fixation component, extends through upper trigger portion 132 and is configured to engage the inner face of front side 140 of lower trigger portion 134. As shown, fastening mechanism 138 is a set screw, but it is understood that fastening mechanism 138 can be of any desired configuration for fixing a position of lower trigger portion 134 on upper trigger portion 132. In addition, it is understood that fastening mechanism 138 can be of any desired length, such that fastening mechanism 138 can extend rearward to or rearward beyond the back edge of one or both of upper trigger portion 132 and lower trigger portion 134.

Fastening mechanism 138 can slide within and along the elongated gap 146 as lower trigger portion 134 is slid along upper trigger portion 132 to adjust the length of trigger 14. Fastening mechanism 138, or the other adjustment mechanism, can also be accessed and adjusted through the elongated gap 146. For example, fastening mechanism 138 can be rotated in a first direction (clockwise or counterclockwise) to engage the inner face of front side 140 of lower trigger portion 134 to fix the position of lower trigger portion 134 on upper trigger portion 132. Fastening mechanism 138 can then be rotated in a second direction (the other of clockwise or counterclockwise) to release lower trigger portion 134 and allow lower trigger portion 134 to slide along upper trigger portion 132.

Lower trigger portion 134 further includes groove 150 extending along the inner face of front side 140 of lower trigger portion 134. Groove 150 can extend parallel to and can have a greater length than brackets 144*a*, 144*b* (e.g., from the top of lower trigger portion 134 to the beginning of curved portion 152). Groove 150 can also have a greater length than lateral sides 142*a*, 142*b*. Groove 150 provides several advantages. In one example, fastening mechanism 138, which extends through upper trigger portion 132, can extend into and slide within groove 150 to maintain alignment between upper trigger portion 132 and lower trigger portion 134 during relative movement as the length of trigger 14 is adjusted. In another example, fastening mechanism 138 can engage the inner surface of groove 150 to fix and secure the position of lower trigger portion 134 with respect to upper trigger portion 132. In yet another example, groove 150 separates lower trigger portion 134 into left and right halves along a lateral line and facilitates flexing of lower trigger portion 134 along groove 150. Such flexion along groove 150 is useful during length adjustment of trigger 14, as the flexing allows gap 146 to increase in width as lower trigger portion 134 slides along upper trigger portion 132, thereby preventing jamming during adjustment.

Stop 148 is located on an inner surface of at least one of lateral sides 142*a*, 142*b* of lower trigger portion 134. While a single stop 148 is shown, it is understood that lower trigger portion 134 can include an additional stop on the opposite lateral sides 142*a*, 142*b* of lower trigger portion 134. Stops 148 engage with indexes 136*a*-136*c* (pairs of each of indexes 136*a*-136*c* can be located on the left and right outer lateral sides of upper trigger portion 132) to secure the position of lower trigger portion 134 with respect to upper trigger portion 132. As such, stops 148 can engage the various indexes 136*a*-136*c* in the manner of a detent. While stop 148 is shown as an inward projection that is configured to extend into indexes 136*a*-136*c*, it is understood that the arrangement could be reversed such that stop 148 could instead be a cavity configured to accept indexes 136*a*-136*c*, which could be projections extending from upper trigger portion 132. Likewise, multiple indexes 136 could be arrayed along the inner surface of lower trigger portion 134 and a stop 148 could be positioned on the outer surface of upper trigger portion 132.

Figure 8B:
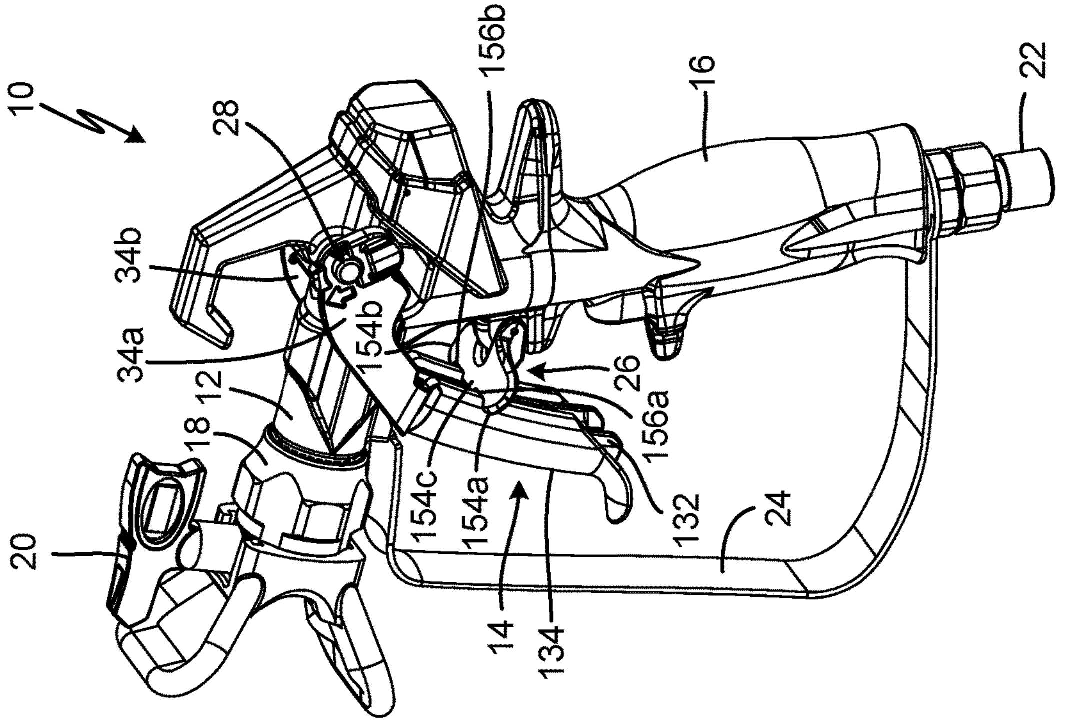
FIG. 8B is an isometric view of a spray gun showing the trigger in a locked state and in the first position.
Figure 8A:
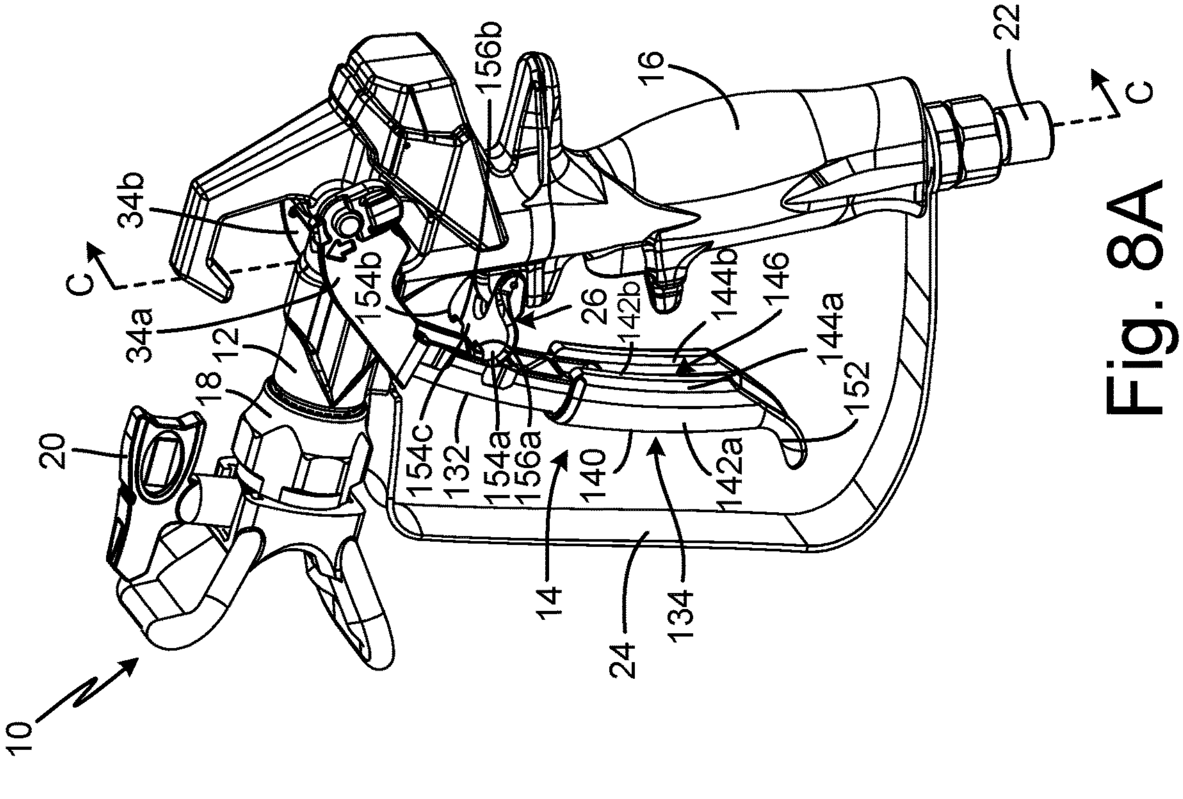
FIG. 8A is an isometric view of a spray gun showing the trigger in the locked state and in the third position.
Figure 8C:
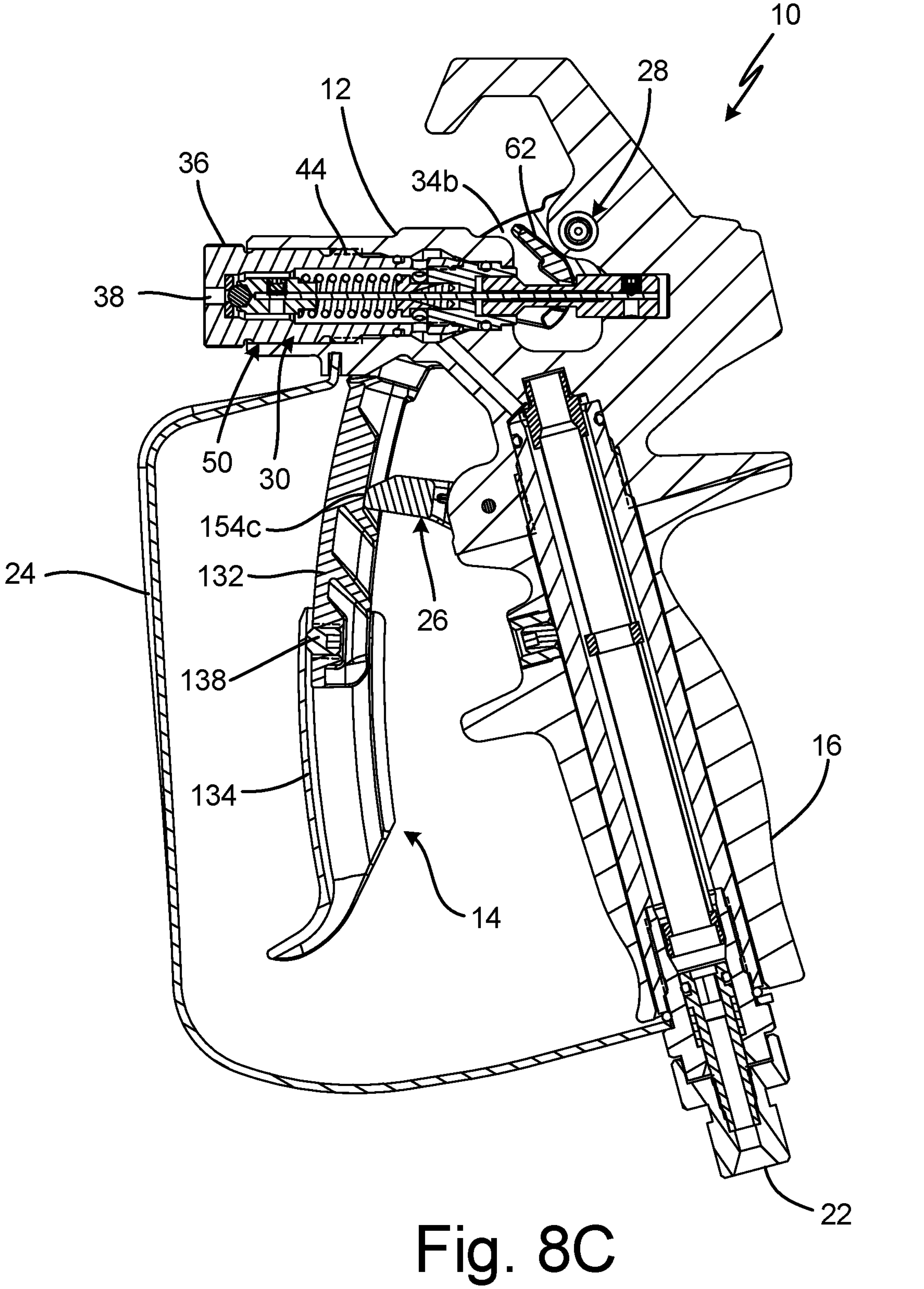
FIG. 8C is a cross-sectional view of a spray gun taken along line C-C in FIG. 8A.

FIG. 8A is an isometric view of spray gun 10 showing trigger 14 in the third position and safety 26 in a deployed state. FIG. 8B is an isometric view of spray gun 10 showing trigger 14 in the first position and safety 26 in the deployed state. FIG. 8C is a cross-sectional view of spray gun 10 taken along line C-C in FIG. 8A with tip mount 18 and tip 20 removed. FIGS. 8A-8C will be discussed together. Gun body 12, trigger 14, handle 16, tip mount 18, tip 20, connector 22, trigger guard 24, safety 26, pivot mechanism 28, and valve cartridge 30 (FIG. 8C) of spray gun 10 are shown. Arms 34*a*, 34*b*; upper trigger portion 132; lower trigger portion 134; and fastening mechanism 138 of trigger 14 are shown. Upper trigger portion 132 includes indexes 136*a*-136*c*. Front side 140; lateral sides 142*a*, 142*b*; brackets 144*a*, 144*b*; gap 146; and curved portion 152 of lower trigger portion 134 are shown in FIG. 8A. Safety 26 includes projections 154*a*-154*c* and recesses 156*a*, 156*b*.

The spray of paint can be abrading if it comes into contact with skin close to the nozzle 40 (FIGS. 1A-1B) of spray gun 10. Safety 26 is provided to avoid inadvertent actuation of trigger 14. Safety 26 is pivotably mounted on gun body 12. It is understood, however, that safety 26 can be pivotably mounted at any suitable location on spray gun 10 for engaging with and preventing actuation of trigger 14. For example, safety 26 could be pivotably mounted on handle 16. Safety 26 is configured to pivot on an axis transverse to spray axis A-A. In some examples, safety 26 pivots on an axis perpendicular to spray axis A-A. Safety 26 pivots between an up position (best seen in FIG. 2A), which allows uninhibited actuation of trigger 14, and the down position (FIGS. 8A-8C), where safety 26 blocks actuation of trigger 14.

Safety includes three projections 154*a*-154*c*. Between the projections 154*a*-154*c* are two recesses 156*a*, 156*b*. The projections 154a-154c and recesses 156a, 156b can engage with various components of trigger 14 depending on the state of extension of trigger 14. For example, when trigger 14 is in an extended position, such as shown in FIG. 8A, middle projection 154c engages an inner surface of upper trigger portion 132, as can be seen in FIG. 8C. Specifically, in the view shown in FIG. 8C, projection 154c extends into a groove within the backside of upper trigger portion 132 to engage a surface of the backside of upper trigger portion 132. Such engagement prevents rearward movement of trigger 14 so long as safety 26 is maintained in the down position.

When trigger 14 is not in an extended state, such as shown in FIG. 8B, recesses 156a, 156b receive lateral sides 142a, 142b of lower trigger portion 134. As such, lower trigger portion 134 engages surfaces of safety 26 located within recesses 156a, 156b. Lower trigger portion 134 can increase the front to back cross-sectional thickness of trigger 14, thereby preventing projection 154c from engaging upper trigger portion 132. Therefore, safety 26 includes different surfaces configured to engage with trigger 14 depending on whether trigger 14 is in an extended or shortened state. In some embodiments, the projections 154a, 154b are not present, in which case recesses 156a, 156b are simply surfaces recessed relative to projection 154c.

Figure 9A:
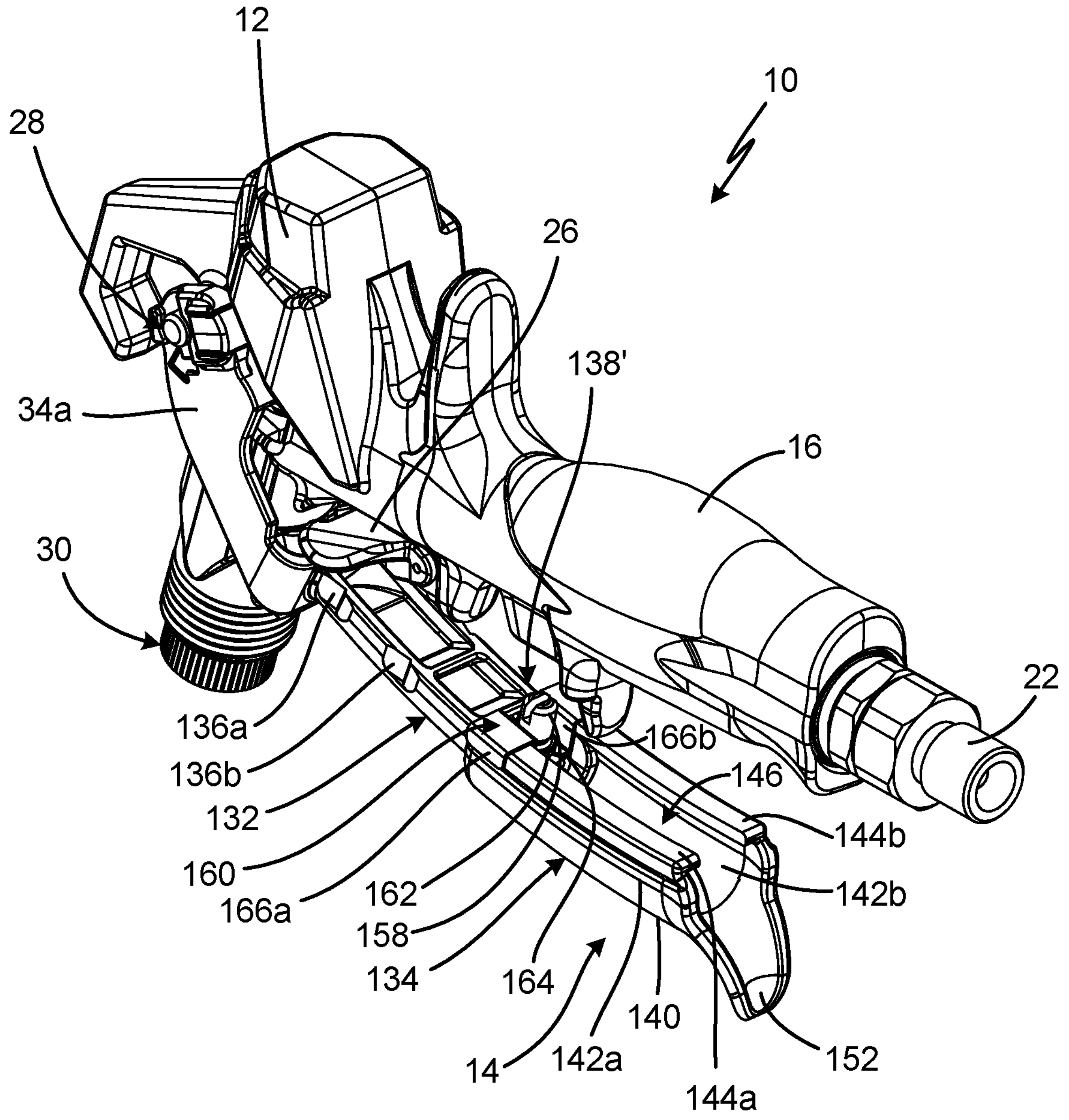
FIG. 9A is an isometric view of a spray gun.
Figure 9B:
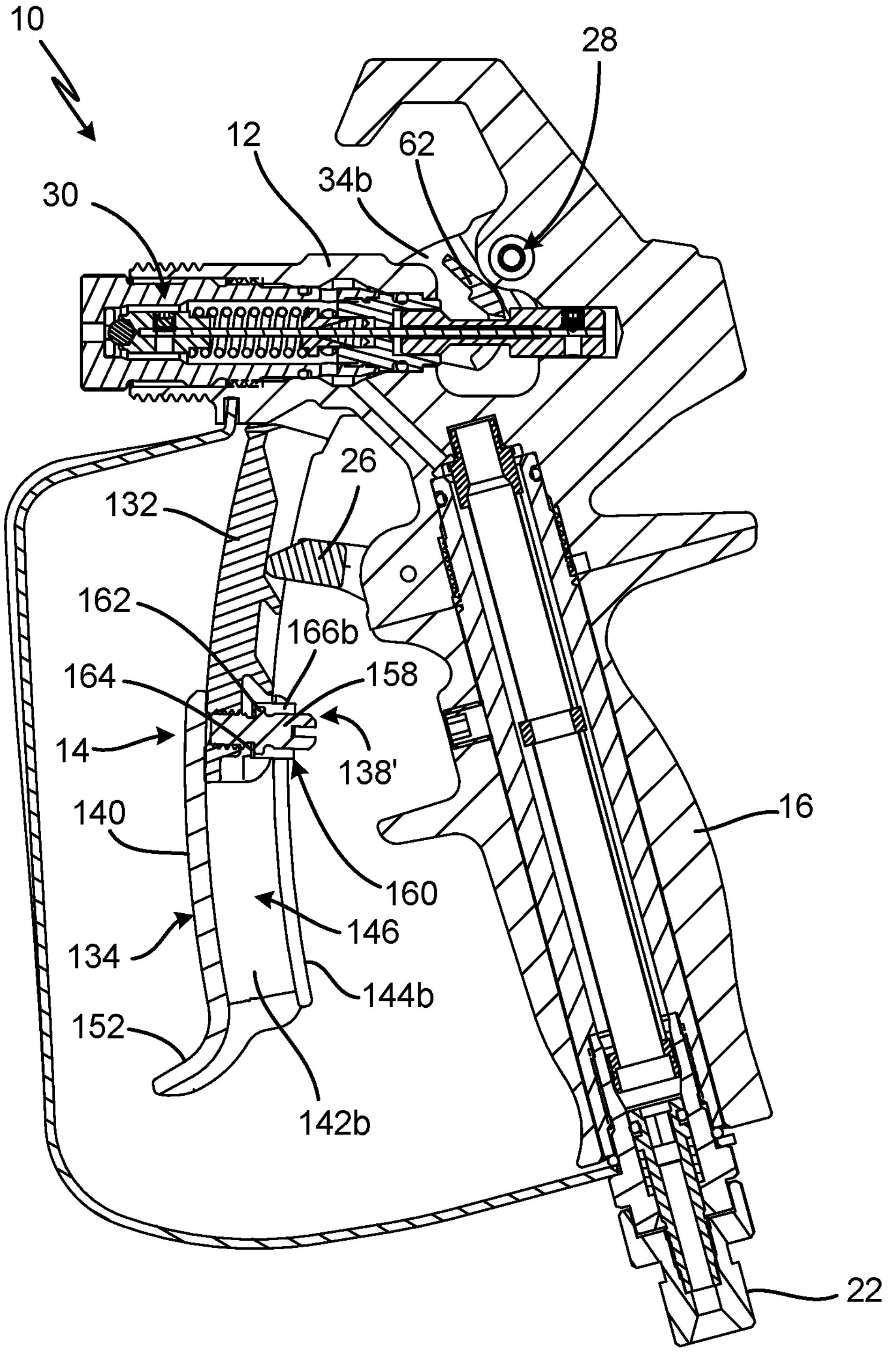
FIG. 9B is a cross-sectional view taken along line 9-9 in FIG. 9A.

FIG. 9A is an isometric view of spray gun 10. FIG. 9B is a cross-sectional view of spray gun 10 taken along line 9-9 in FIG. 9A. FIGS. 9A and 9B will be discussed together. Gun body 12, trigger 14, handle 16, connector 22, safety 26, pivot mechanism 28, and valve cartridge 30 of spray gun 10 are shown. Arms 34a, 34b; actuator 62; upper trigger portion 132; lower trigger portion 134; and fastening mechanism 138' of trigger 14 are shown. Indexes 136a and 136b of upper trigger portion 132 are shown. Front side 140; lateral sides 142a, 142b; brackets 144a, 144b; gap 146; stop 148; and curved portion 152 of lower trigger portion 134 are shown. Fastening mechanism 138' includes screw 158 and fastener bracket 160. Screw 158 includes flange 162. Fastener bracket 160 includes body 164 and wings 166a, 166b.

Trigger 14 is pivotably mounted to gun body 12 and is configured to control spraying by spray gun 10. Lower trigger portion 134 is disposed on and supported by upper trigger portion 132. Lower trigger portion 134 is slidable along the length of upper trigger portion 132 to adjust the length of trigger 14. Brackets 144a, 144b wrap partially around upper trigger portion 132 and form a track within which upper trigger portion 132 slides relative to lower trigger portion 134. Brackets 144a, 144b can extend parallel to each other on the backside of lower trigger portion 134.

Gap 146 is an elongate opening defined between brackets 144a, 144b. Fastening mechanism 138' is configured to maintain a position of lower trigger portion 134 relative to upper trigger portion 132. Specifically, fastening mechanism 138' is configured to exert a clamping force on lower trigger portion 134 to secure lower trigger portion 134 to upper trigger portion 132. As such, fastening mechanism 138' maintains trigger 14 at a desired length.

Fastener bracket 160 is partially disposed within gap 146 and extends around brackets 144a, 144b of lower trigger portion 134. Body 164 of fastener bracket 160 is disposed within gap 146 and is positioned adjacent a back side of upper trigger portion 132. Wings 166a, 166b extend from opposite lateral sides of body 164 and wrap around brackets 144a, 144b of lower trigger portion 134. As such, wings 166a, 166b extend around and cover a portion of each of the inner lateral side, back side, and outer lateral side of brackets 144a, 144b, respectively. Wings 166a, 166b can thereby form slots within which brackets 144a, 144b of lower trigger portion 134 slide as the position of lower trigger portion 134 is adjusted relative to upper trigger portion 132. The slots formed by wings 166a, 166b can assist in maintaining the orientation of lower trigger portion 134 on upper trigger portion 132 as the length of trigger 14 is adjusted.

Screw 158 extends through body 164 and into upper trigger portion 132. In some examples, screw 158 can engage an inner face of front side 140 of lower trigger portion 134. It is understood, however, that screw 158 does not need to engage front side 140 of lower trigger portion 134 to secure lower trigger portion 134 to upper trigger portion 132. Flange 162 of screw 158 engages an outer face of body 164 of fastener bracket 160, and screw 158 is configured to exert a force on fastener bracket 160 via flange 162.

During operation, fastening mechanism 138' can be loosened to allow the user to slide lower trigger portion 134 along upper trigger portion 132 and relative to fastening mechanism 138'. Screw 158 is rotated in a first direction (clockwise or counterclockwise) to remove the force exerted on body 164 by flange 162, thereby loosening fastening mechanism 138'. With the force removed from body 164, wings 166a, 166b do not exert a clamping force on brackets 144a, 144b, and the user can pull or push lower trigger portion 134 to adjust a length of trigger 14. Once lower trigger portion 134 is in the desired position on upper trigger portion 132, screw 158 is rotated in a second direction (the other of clockwise or counterclockwise) to tighten fastening mechanism 138'. Rotating screw 158 in the second direction causes flange 162 to exert a forward force on body 164, thereby driving fastener bracket 160 towards upper trigger portion 132. The forward force on body 164 also drives wings 166a, 166b towards upper trigger portion 132 due to the connection of wings 166a, 166b with body 164. Wings 166a, 166b surround a portion of brackets 144a, 144b such that driving wings 166a, 166b forward clamps brackets 144a, 144b between wings 166a, 166b and upper trigger portion 132. The clamping force secures lower trigger portion 134 to upper trigger portion 132. In addition, wings 166a, 166b assist in maintaining the position of lower trigger portion 134 on upper trigger portion 132 as trigger 14 is actuated during spraying by wrapping around the back sides and edges of brackets 144a, 144b.

DISCUSSION OF POSSIBLE EMBODIMENTS

The following are non-exclusive descriptions of possible embodiments of the present invention.

A valve cartridge for a paint spray gun includes a housing, a valve disposed in the housing, a spring, a slider disposed at least partially outside of the housing, and a stem. The housing has a first end, a second end, a housing body extending between the first end and the second end, a cartridge outlet extending through the first end, a chamber within the housing, and at least one side port extending through the housing and in fluid communication with the chamber. The valve is configured to control the flow of paint from the chamber through the cartridge outlet. The spring is configured to bias a valve member of the valve towards a closed state. The stem extends along an axis between the valve member and the slider. The valve member and the slider are fixed with respect to the stem such that the slider can actuate the valve member from the closed state to an open state via the stem. The housing, the valve, the spring, the slider, and the stem form a discrete assembly configured to control spraying of paint.

The valve cartridge of the preceding paragraph can optionally include, additionally and/or alternatively, any one or more of the following features, configurations and/or additional components:

The slider includes a front end; a back end having a first diameter; and a neck extending between and connecting the front end and the back end, wherein the neck has a second diameter, the second diameter being smaller than the first diameter.

The back end and the neck together form an annular trigger seat.

A seal body mounted to the second end of the housing; and a seal supported by the seal body. The stem extends through the seal between the valve member and the slider, the stem moving with respect to the seal as the seal prevents paint from moving past the seal along the stem.

The seal body includes a first bore extending into a first side of the seal body, the seal at least partially disposed in the first bore; a seal retainer at least partially disposed within the first bore, wherein the seal retainer includes a radially extending retainer flange and wherein the seal retainer interfaces with the seal to retain the seal within the first bore; and a second bore extending into a second side of the seal body. The stem extends through each of the first bore and the second bore. The front end of the slider is at least partially disposed within the second bore. The spring interfaces with the retainer flange.

The seal is nested within the seal body such that the seal is disposed within both the seal body and the housing.

The seal body is mounted within a socket of the housing by a threaded interface between the seal body and the housing.

The slider extends into and is configured to move within a cavity formed in a bore formed in the seal body as the slider shifts to actuate the valve.

The housing further includes a threaded portion disposed on the exterior of the housing. The threaded portion is disposed between the first end of the housing and the plurality of ports.

A first annular groove extending about the exterior of the housing and configured to receive a first o-ring seal, wherein the first annular groove is disposed axially between the threaded portion and the plurality of ports; a second annular groove configured to receive a second o-ring seal; wherein the at least one side port is disposed axially between the first annular groove and the second annular groove.

A seal body mounted to the second end of the housing; wherein the second annular groove extends about an exterior of the seal body; and wherein the stem extends through the seal body between the seal assembly and the slider.

The first end of the housing includes an exterior grip surface that is grooved or knurled for hand grip.

The valve member includes a seal holder mounted on the stem; a ball mounted on the seal holder; a seat disposed within the chamber adjacent the cartridge outlet; wherein the ball is configured to interface with the seat with the valve member in the closed state; wherein a first end of the spring interfaces with an upstream end of the seal holder and the ball is mounted on a downstream end of the seal holder.

A second end of the spring interfaces with a flange of a seal holder, the seal holder mounted to a seal body attached to an end of the housing opposite the cartridge outlet, wherein the seal holder retains a seal within the seal body, and wherein the stem extends through the seal.

A first set screw extending through the slider and engaging the stem to thereby fix the slider to the stem; a second set screw extending through the valve member and engaging the stem to thereby fix the valve member to the stem; wherein the first set screw is disposed outside of the housing and the second set screw is disposed within the housing.

A method includes inserting the valve cartridge into a bore of the paint spray gun; interfacing exterior threading formed on the housing with interior threading formed within the bore of the paint spray gun, thereby securing the discrete assembly to the paint spray gun; and threading a tip mount onto the paint spray gun over the first end of the housing.

A method includes rotating the valve cartridge relative to a bore of the paint spray gun, thereby unthreading exterior threading formed on the housing from interior threading formed within the bore of the paint spray gun; and pulling the valve cartridge axially out of the bore of the paint spray gun, such that the valve cartridge is fully removed from the paint spray gun as the discrete assembly.

A spray gun for spraying paint includes a gun body having a gun bore extending on an axis; a trigger having an actuator, the trigger mounted to the gun body; a handle connected to the gun body; and the valve cartridge mounted within the gun bore. The actuator is configured to interface with the slider to actuate the valve member by the slider to release paint from the spray gun. The valve cartridge forms a discrete assembly independent of the gun body such that the valve cartridge can be inserted into the gun body as a single piece, can regulate spraying of paint when inserted into the gun body, and can be removed from the gun body as the single piece.

The spray gun of the preceding paragraph can optionally include, additionally and/or alternatively, any one or more of the following features, configurations and/or additional components:

Exterior threading is disposed on an exterior of the housing and interior threading is disposed within the gun bore; the exterior threading is configured to interface with the interior threading to secure the valve cartridge to the gun body; the gun bore includes a gun chamber configured to receive paint provided to the gun body; the housing further includes a first annular groove extending about an exterior of the housing and configured to receive a first annular seal; and the at least one side port is disposed on an opposite side of the first annular groove from the threaded interface.

A threaded interface between the exterior threading and the interior threading is the only interface between the valve cartridge and the gun body that prevents axial movement of the valve cartridge relative to the gun body.

The gun body includes a front end, wherein the gun bore is disposed in the front end and on the axis; a back end having a gun cavity aligned on the axis; a void disposed between the front end and the back end, wherein the void is open at least through a top side and first and second lateral sides of the gun body.

The gun cavity extends partially into the back end of the gun body, such that the gun cavity is not open through a back side of the back end of the gun body.

A spray gun configured for spraying paint includes a gun having a gun body that includes a gun bore, a trigger having an actuator, a handle extending from the gun body, and a paint inlet port; a valve cartridge disposed within the gun bore. The valve cartridge fully contains a valve for controlling spraying from the gun. A slider of the valve cartridge is connected to the valve and is in contact with the actuator of the trigger such that the trigger can actuate slider to actuate the valve to an open position to release paint from the spray gun. The valve cartridge is a unitary assembly that is removable from a front end of the gun bore as a single piece.

A method of installation includes aligning a valve cartridge with a spray axis of a spray gun body, the spray gun body including a front end, a back end, and a void disposed between the front end and the back end; shifting the valve cartridge axially along the spray axis, such that the valve cartridge extends into a bore aligned along the spray axis and extending through the front end to the void, and such that a slider of the valve cartridge extends out of the bore across the void and into a cavity aligned on the spray axis and extending into the back end; and securing the valve cartridge within the spray gun body.

The method of the preceding paragraph can optionally include, additionally and/or alternatively, any one or more of the following features, configurations and/or additional components:

The step of securing the valve cartridge within the spray gun body includes rotating the valve cartridge on the spray axis to engage first threads on an exterior of the valve cartridge with second threads on an interior of the bore.

The step of securing the valve cartridge within the spray gun body includes engaging an actuator connected to a trigger with the slider, and threading a tip mount onto third threading on the exterior of the spray gun body to attach the tip mount to the spray gun body. Wherein the valve cartridge is held in the bore of the spray gun body by only the second threads, the actuator, and the tip mount such that the valve cartridge can slide out of the bore of the spray gun body upon release of second threads from the first threads, the actuator from the slider, and the tip mount from the spray gun body.

A spray gun includes a gun body defining a longitudinal spray axis and having a gun bore; a valve cartridge disposed within the gun bore; a trigger mechanism mounted on the gun body, the trigger mechanism including an actuator; wherein the actuator is configured to engage a slider of the valve cartridge to shift the slider axially to control actuation spraying by the spray gun.

The spray gun of the preceding paragraph can optionally include, additionally and/or alternatively, any one or more of the following features, configurations and/or additional components:

The gun body includes a front end having the gun bore aligned on the axis; a back end having a gun cavity aligned on the axis; and a void disposed between the front end and the back end, wherein the void is open at least through a top side and first and second lateral sides of the gun body. The valve cartridge includes a housing disposed in the gun bore; a valve element disposed within the housing and configured to control fluid flow out of the housing; and the slider connected to the valve element such that movement of the slider causes movement of the valve element, wherein the slider extends into the gun cavity.

The trigger mechanism includes a trigger; and a first arm extending from the trigger; wherein the actuator projects from the first arm; and wherein the actuator is disposed within the void and engages the slider, such that the actuator can shift the slider axially.

The first arm is connected to the gun body by a pivot mechanism, such that the trigger mechanism pivots on the pivot mechanism.

The pivot mechanism includes a pivot spring disposed within a lateral bore formed in the gun body; and a first detent disposed at least partially within the lateral bore. The pivot spring is configured to bias the first detent laterally relative to the gun body.

The first arm includes a first aperture extending through the first arm; and the first detent is configured to engage the first aperture such that the first detent and the first aperture form a pivot point of the trigger mechanism.

A first slot disposed on an inner surface of the first arm and extending to the first aperture.

The first detent is capable of being moved bore between an engaged state, where the first detent extends into the first aperture, and a disengaged state, where the first detent is disengaged from the first aperture.

The trigger mechanism is movable between a spray position, where the first detent engages the first aperture and the actuator engages the slider, and a repair position, where the first detent is disposed in the first slot and the actuator is radially spaced from the slider.

A second arm extending from the trigger, wherein the actuator extends between and is connected to each of the first arm and the second arm; a second aperture extending through the second arm; a second slot disposed on an inner surface of the second arm and extending to the second aperture; a second detent disposed at least partially disposed within the lateral bore, wherein the pivot spring is configured to bias the first detent and the second detent in opposite lateral directions relative to the gun body; wherein the second detent is configured to engage the second aperture, and wherein the second detent is capable of being moved between an engaged state and a disengaged state.

The gun cavity is open on a first axial end of the gun cavity, the first axial end facing the void, and wherein the gun cavity is closed on a second axial end of the gun cavity that is opposite the first axial end.

The slider includes a forward end; a rearward end; a neck extending between and connecting the front end and the back end; wherein the actuator is configured to engage a trigger seat formed on the back end, the trigger seat extending radially outward relative to the neck.

A method includes shifting a trigger mechanism of a spray gun from a spray position to a repair position, the trigger mechanism being connected to a gun body of the spray gun in both the spray position and the repair position; and shifting a valve cartridge in a first axial direction along a spray axis of the gun body to remove the valve cartridge from the gun body.

The method of the preceding paragraph can optionally include, additionally and/or alternatively, any one or more of the following features, configurations and/or additional components:

The trigger mechanism moves both radially and axially relative to the spray axis as the trigger mechanism shifts from the spray position to the repair position.

The step of shifting the trigger mechanism of the spray gun from the spray position to the repair position includes: decreasing a cross-sectional width of a pivot mechanism on which the trigger mechanism is mounted to disengage the pivot mechanism from the trigger mechanism; and shifting the trigger mechanism relative to the pivot mechanism.

The step of decreasing the cross-sectional width of the pivot mechanism on which the trigger mechanism is mounted to disengage the pivot mechanism from the trigger mechanism includes: pinching a first detent extending from a first lateral side of the gun body towards a second lateral side of the gun body; pinching a second detent extending from the second lateral side of the gun body towards a first lateral side of the gun body; wherein a pivot spring disposed between the first detent and the second detent is configured to bias the first detent away from the second lateral side and to bias the second detent away from the first lateral side.

Pinching the first detent causes the first detent to disengage from a first aperture extending through a first arm of the trigger mechanism, and pinching the second detent causes the second detent to disengage from a second aperture extending through a second arm of the trigger mechanism.

The first arm further includes a first slot disposed on a first arm inner surface of the first arm, and the second arm further includes a second slot disposed on a second arm inner surface; and the first detent slides within the first slot and the second detent slides within the second slot as the trigger mechanism shifts to the repair position.

The pivot spring biases the first detent and the second detent into engagement with the first arm inner surface and the second arm inner surface, respectively, as the trigger mechanism shifts to the repair position.

The trigger mechanism inhibits axial movement of the valve cartridge in the first axial direction when the trigger mechanism is in the spray position to prevent removal of the valve cartridge from the bore with the trigger mechanism in the spray position.

Aligning a second valve cartridge on the spray axis and shifting the second valve cartridge axially along the spray axis and into the gun body; and shifting the trigger mechanism from the repair position to the spray position with the second valve cartridge disposed in the gun body to secure the second valve cartridge in the gun body; wherein the trigger mechanism inhibits axial movement of the valve cartridge in the first axial direction when the trigger mechanism is in the spray position to prevent removal of the valve cartridge from the bore with the trigger mechanism in the spray position.

A spray gun for spraying paint includes a gun body defining a longitudinal spray axis; a spray valve disposed within the gun body, the spray valve configured to control spraying of paint by the spray gun; and a trigger mounted on the gun body and configured to actuate the spray valve between an open state and a closed state. The trigger includes an upper portion mounted to the spray gun; and a lower portion disposed on the upper portion and movable relative to the upper portion such that the trigger is extendable, wherein both of the upper portion and the lower portion are exposed to be engaged by fingers of a user to actuate the trigger when the trigger is extended to a lengthened state.

The spray gun of the preceding paragraph can optionally include, additionally and/or alternatively, any one or more of the following features, configurations and/or additional components:

The trigger is extendable between a first position corresponding to a shortened state, a second position intermediate the shortened state and a lengthened state, and a third position corresponding to the lengthened state.

The upper portion is formed from a metal and the lower portion is formed from a polymer.

The trigger further includes a first arm extending from the upper portion and disposed on a first lateral side of the gun body; a second arm extending from the upper portion and disposed on a second lateral side of the gun body; an actuator extending between and connecting the first arm and the second arm, wherein the actuator is configured to engage a portion of a valve mechanism containing the spray valve to actuate the spray valve; and wherein the first arm and the second arm are mounted to the gun body by a pivot mechanism, such that the trigger pivots on the pivot mechanism.

The upper portion includes a plurality of indexes disposed along a length of the upper portion; and the lower portion includes at least one stop configured to engage with the plurality of indexes to maintain a position of the lower portion relative to the upper portion.

The lower portion includes a first front side; a first lateral side extending rearward from the front side; and a second lateral side extending rearward from the front side.

The lower portion is configured to wrap around a front side of the upper portion and lateral sides of the upper portion.

The lower portion is configured to at least partially wrap around the front side of the upper portion, the lateral sides of the upper portion, and a back side of the upper portion; and the first front side, the first lateral side, and the second lateral side of the lower portion slide relative to the front side and the lateral sides of the upper portion as the lower portion of the trigger is extended to the lengthened state.

The lower portion includes a first bracket projecting from an end of the first lateral side opposite the first front side, the first bracket projecting towards the second lateral side; and a second bracket projecting from an end of the second lateral side opposite the front side, the second bracket projecting towards the first lateral side.

A gap is formed between the first bracket and the second bracket, and wherein a back surface of the upper portion is accessible through the gap with the lower portion disposed on the upper portion.

One of the lower portion and the upper portion wraps at least partially around the other of the lower portion and the upper portion.

One of the lower portion and the upper portion extends into and slides within the other of the lower portion and the upper portion.

The lower portion further includes a stop projecting from the first lateral side towards the second lateral side, the stop disposed between the first bracket and the front side.

The lower portion further includes a curved portion disposed at a lower distal end of the lower portion.

A fastening mechanism configured to secure the lower portion at a desired location on the upper portion.

The fastening mechanism comprises a set screw extending through the upper portion and engages an inner face of a front side of the lower portion.

The set screw is accessible through a gap formed between a first lateral side and a second lateral side of the lower portion.

The gap extends along an interface between the lower portion and the upper portion such that the set screw can be accessed regardless of which of the multiple locations on the upper portion the lower portion is disposed at.

The fastening mechanism includes a fastener bracket and a set screw. The fastener body having a body disposed in a gap formed between a first lateral side and a second lateral side of the lower portion; a first wing extending from the body and wrapping around a back end of the first lateral side; and a second wing extending from the body and wrapping around a back end of the second lateral side. The set screw extending through the body and into the upper portion, wherein the set screw is rotatable to increase and decrease a force applied on the body by the set screw.

The trigger is adjustable between a two-finger configuration and a four-finger configuration.

In the two-finger configuration the lower portion of the trigger is configured to be contacted by two fingers of a user to actuate the trigger, and in the four-finger configuration the upper portion is configured to be contacted by the two fingers of the user and the lower portion is configured to be contacted by another two fingers of the user.

In the two-finger configuration, the lower portion of the trigger covers a first part of the upper portion such that the first part of the upper portion is not exposed for contact with one or more fingers of the user, and in the four-finger configuration the lower portion is moved to expose the first part of the upper portion so that the first part can be engaged by one or more fingers of the user for actuating the trigger.

The trigger is adjustable to a three-finger configuration where the trigger has a length between the two-finger configuration and the four-finger configuration.

A safety pivotably mounted on the spray gun, the safety movable between a first position where the safety is disengaged with from the trigger and a second position where the safety is engaged with the trigger to prevent actuation of the trigger. The safety engages the lower portion when the trigger is in a shortened state and the safety engages the upper portion but not the lower portion when the trigger is in a lengthened state.

A method of adjusting a trigger length of a paint spray gun includes disengaging a fastening mechanism from a lower portion of a trigger of a spray gun; pulling the lower portion lengthwise along an upper portion of the trigger from a first position to a second position; and reengaging the fastening mechanism with the lower portion to secure the lower portion in the second position.

The method of the preceding paragraph can optionally include, additionally and/or alternatively, any one or more of the following features, configurations and/or additional components:

The step of pulling the lower portion lengthwise includes pulling the lower portion from a two-finger configuration where the trigger is actuated by engaging the lower portion with a first two fingers of the user, to a four-finger configuration where the trigger is actuated by engaging the upper portion with the first two fingers of the user and engaging the lower portion with a second two fingers of the user.

Adjusting the lower portion to a third position corresponding to a three-finger configuration where the trigger is actuated by the user engaging the trigger with three fingers of the first two fingers and the second two fingers.

The lower portion covers a front side of the upper portion with the lower portion in the first position, and wherein the front side of the upper portion is at least partially exposed with the lower portion in the second position.

The step of disengaging the fastening mechanism includes accessing the fastening mechanism through a gap disposed between a first bracket on a first lateral side of the lower portion and a second bracket on a second lateral side of the lower portion; and a stop projecting from one of the first lateral side and the second lateral side engages a first index of the upper portion with the lower portion in the first position and the stop engages a second index of the upper portion with the lower portion in the second position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sprayer comprising:
- a body defining a longitudinal spray axis and having a bore extending into a front end of the body;
- a valve cartridge disposed within the bore;
- an actuator configured to engage a slider of the valve cartridge to shift the slider axially to control spraying by the sprayer;
- wherein the actuator is movable relative to the body and at least partially radially relative to the spray axis between a first state, in which the actuator interfaces with the slider such that the actuator can displace the slider to open a valve of the valve cartridge, and a second state, in which the actuator is spaced radially outward of any portion of the slider such that the slider can pass fully axially by the actuator towards the front end;
- wherein the actuator is configured to shift upward away from and relative to a handle extending from the body to move from the first state to the second state; and
- wherein a trigger is mounted to the body with the actuator in both the first state and the second state.

2. The sprayer of claim 1, wherein:
- the body further comprises:
  - a front end having the bore aligned on the axis;
  - a back end having a cavity aligned on the axis; and
  - a void disposed between the front end and the back end, wherein the void is open at least through a top side and first and second lateral sides of the body;
- the valve cartridge further comprises:
  - a housing disposed in the bore;
  - a valve element disposed within the housing and configured to control fluid flow out of the housing; and
  - the slider connected to the valve element such that movement of the slider causes movement of the valve element, wherein the slider extends into the cavity.

3. The sprayer of claim 2, wherein:
- the trigger includes a pull and a first arm extending from the pull;
- the actuator projects from the first arm.

4. The sprayer of claim 3, wherein the first arm is connected to the body by a pivot mechanism, such that the trigger pivots on the pivot mechanism.

5. The sprayer of claim 4, wherein the pivot mechanism comprises:
- a pivot spring disposed within a lateral bore formed in the body; and
- a first detent disposed at least partially within the lateral bore;
- wherein the pivot spring is configured to bias the first detent laterally relative to the body.

6. The sprayer of claim 2, wherein the cavity is open on a first axial end of the cavity, the first axial end facing the void, and wherein the cavity is closed on a second axial end of the cavity that is opposite the first axial end.

7. The sprayer of claim 1, wherein the slider comprises:
- a forward end;
- a rearward end; and
- a neck extending between and connecting the forward end and the rearward end;
- wherein the actuator is configured to engage a trigger seat formed on the rearward end, the trigger seat extending radially outward relative to the neck.

8. A sprayer comprising:
- a body defining a longitudinal spray axis and having a bore;
- a valve cartridge disposed within the bore;
- an actuator configured to engage a slider of the valve cartridge to shift the slider axially to control spraying by the sprayer;

wherein the actuator is movable relative to the body between a first state, in which the actuator interfaces with the slider such that the actuator can displace the slider to open a valve of the valve cartridge, and a second state, in which the actuator is spaced from the slider such that the slider can pass axially by the actuator;

wherein the actuator is configured to shift upward away from a handle extending from the body to move from the first state to the second state;

wherein a trigger is mounted to the body with the actuator in both the first state and the second state, the trigger including a first arm connected to the body by a pivot mechanism such that the trigger pivots on the pivot mechanism;

wherein the pivot mechanism includes a pivot spring disposed within a lateral bore formed in the body and a first detent disposed at least partially within the lateral bore, the pivot spring configured to bias the first detent laterally relative to the body;

wherein the first arm includes a first aperture extending through the first arm; and wherein the first detent is configured to engage the first aperture such that the first detent and the first aperture form a pivot point of the trigger.

9. The sprayer of claim 8, further comprising:

a first slot disposed on an inner surface of the first arm and extending to the first aperture.

10. The sprayer of claim 9, wherein the first detent is capable of being moved relative to the lateral bore between a first detent state, where the first detent extends into the first aperture, and a second detent state, where the first detent is disengaged from the first aperture.

11. The sprayer of claim 10, wherein the first detent engages the first aperture and the actuator engages the slider with the trigger in the spray state and the first detent is disposed in the first slot and the actuator is radially spaced from the slider relative to the longitudinal spray axis with the trigger in the disengaged state.

12. The sprayer of claim 11, further comprising:

a second arm extending from the pull, wherein the actuator extends between and is connected to each of the first arm and the second arm;

a second aperture extending through the second arm;

a second slot disposed on an inner surface of the second arm and extending to the second aperture;

a second detent disposed at least partially disposed within the lateral bore, wherein the pivot spring is configured to bias the first detent and the second detent in opposite lateral directions relative to the body;

wherein the second detent is configured to engage the second aperture, and wherein the second detent is capable of being moved between an engaged state and a disengaged state.

13. A sprayer comprising:

a body defining a longitudinal spray axis and having a bore, the body comprising:

a front end having a bore aligned on the spray axis;

a back end having a cavity aligned on the spray axis;

a void disposed between the front end and the back end, wherein the void is open at least through a top side of the body, a first lateral side of the body, and a second lateral side of the body;

a valve cartridge disposed within the bore, the valve cartridge containing a valve for controlling spraying from the sprayer, wherein a slider of the valve cartridge is at least partially disposed in the void, the slider configured to shift axially to actuate the valve between an open state and a closed state;

a trigger mounted on the body, the trigger comprising:

a pull disposed on a bottom side of the body;

a first arm extending from the trigger and disposed on the first lateral side of the body;

a second arm extending from the trigger and disposed on the second lateral side of the body;

an actuator extending between the first arm and the second arm, wherein the actuator is disposed within the void and is configured to engage a slider of the valve cartridge to shift the slider axially to control spraying by the sprayer;

a pivot mechanism supported by the gun body, the trigger mounted to the pivot mechanism such that the trigger can pivot on the pivot mechanism;

wherein the trigger is movable relative to the pivot mechanism and relative to the body between a spray state, in which the actuator is aligned with the slider such that pulling of the trigger causes the actuator to engage the slider and displace the slider to open the valve, and a disengaged state, in which the actuator is misaligned with and spaced away from the slider such that the actuator is disposed radially outward of any portion of the slider and such that the slider can move axially past the actuator along the longitudinal spray axis and towards the front end during dismounting of the valve cartridge from within the bore;

wherein the trigger is mounted to the body by the pivot mechanism with the trigger in both the spray state and the disengaged state.

14. The sprayer of claim 13, wherein the valve cartridge further comprises:

a housing disposed in the bore;

a valve element disposed within the housing and configured to control fluid flow out of the housing; and the slider connected to the valve element such that movement of the slider causes movement of the valve element, wherein the slider extends into the cavity.

15. The sprayer of claim 13, wherein the cavity is open on a first axial end of the cavity, the first axial end facing the void, and wherein the cavity is closed on a second axial end of the cavity that is opposite the first axial end.

16. The sprayer of claim 13, wherein the slider comprises:

a forward end;

a rearward end; and a neck extending between and connecting the forward end and the rearward end;

wherein the actuator is configured to engage a trigger seat formed on the rearward end, the trigger seat extending radially outward relative to the neck.

17. The sprayer of claim 13, wherein the first arm is connected to the body by a pivot mechanism, such that the trigger pivots on the pivot mechanism.

18. The sprayer of claim 13, wherein the pivot mechanism comprises:

a pivot spring disposed within a lateral bore formed in the body; and a first detent disposed at least partially within the lateral bore;

wherein the pivot spring is configured to bias the first detent laterally relative to the body.

19. A sprayer comprising:

a body defining a longitudinal spray axis and having a bore;

a valve cartridge disposed within the bore;

an actuator configured to engage a slider of the valve cartridge to shift the slider axially to control spraying by the sprayer;

wherein the actuator is movable relative to the body between a first state, in which the actuator interfaces with the slider such that the actuator can displace the slider to open a valve of the valve cartridge, and a second state, in which the actuator is spaced from the slider such that the slider can pass axially by the actuator along the longitudinal spray axis to allow the valve cartridge to move out of the bore to dismount the valve cartridge from the body, the actuator moving away from the spray axis from the first state to the second state, and the actuator moving towards the spray axis from the second state to the first state;

wherein the actuator is configured to shift upward away from and relative to a handle extending from the body to move from the first state to the second state; and wherein a trigger is mounted to the body with the actuator in both the first state and the second state.

* * * * *